(12) United States Patent
Riley et al.

(10) Patent No.: US 11,919,605 B1
(45) Date of Patent: Mar. 5, 2024

(54) HYDRAULIC BRAKE SYSTEM AND APPARATUS

(71) Applicant: Syscend, Inc., Irvine, CA (US)

(72) Inventors: Brian Michael Riley, Sacramento, CA (US); Roger Tong, Berkeley, CA (US)

(73) Assignee: Syscend, Inc., Austin, TX (US)

( * ) Notice: Subject to any disclaimer, the term of this patent is extended or adjusted under 35 U.S.C. 154(b) by 138 days.

(21) Appl. No.: 16/923,443

(22) Filed: Jul. 8, 2020

Related U.S. Application Data

(63) Continuation-in-part of application No. 16/379,514, filed on Apr. 9, 2019, now Pat. No. 11,390,355, which is a continuation of application No. 14/612,166, filed on Feb. 2, 2015, now Pat. No. 10,252,770.

(60) Provisional application No. 62/871,279, filed on Jul. 8, 2019, provisional application No. 61/934,538, filed on Jan. 31, 2014.

(51) Int. Cl.
  *B62L 3/08* (2006.01)
  *B62L 1/10* (2006.01)
  *B62L 3/02* (2006.01)

(52) U.S. Cl.
  CPC .................. *B62L 3/08* (2013.01); *B62L 3/02* (2013.01); *B62L 1/10* (2013.01)

(58) Field of Classification Search
  CPC .... B62L 1/00; B62L 1/005; B62L 1/10; B62L 1/12; B62L 3/02; B62L 3/08; B60T 1/04; B60T 1/06; B60T 11/06; B60T 11/046; B60T 11/10
  USPC ...................................................... 188/24.22
  See application file for complete search history.

(56) References Cited

U.S. PATENT DOCUMENTS

| | | | |
|---|---|---|---|
| 662,602 | A | 11/1900 | Schmidt et al. |
| 2,871,988 | A | 2/1959 | Wilkerson |
| 3,173,517 | A | 3/1965 | Powlas |

(Continued)

FOREIGN PATENT DOCUMENTS

| | | |
|---|---|---|
| DE | 26 57 350 A1 | 7/1977 |
| DE | 41 22 491 A1 | 1/1993 |

(Continued)

OTHER PUBLICATIONS

English machined translation of DE-4216461 A1, Description only. Nov. 25, 1993.*

(Continued)

*Primary Examiner* — Robert A. Siconolfi
*Assistant Examiner* — San M Aung
(74) *Attorney, Agent, or Firm* — Knobbe Martens Olson & Bear, LLP

(57) ABSTRACT

The present invention is directed towards a disk braking system for a bicycle having a rear disk coupled to a rear wheel. A rear brake caliper is coupled to a rear brake lever and the rear brake caliper is also coupled to a hydraulic actuator which has a piston that slides within a cylinder filled with hydraulic fluid and hydraulic tubing coupled to the cylinder and a front brake. When the rear wheel and rear disk are rotating, the rear brake caliper can be actuated which causes compresses rear brake caliper against the rear disk to slow the rotation of the rear wheel. The movement of the rear brake caliper can actuate the hydraulic actuator which causes hydraulic fluid to flow through the hydraulic tubing to actuate a front brake.

20 Claims, 26 Drawing Sheets

(56) References Cited

U.S. PATENT DOCUMENTS

| | | |
|---|---|---|
| 3,547,229 A | 12/1970 | Pollinger et al. |
| 3,842,946 A | 10/1974 | Blevens |
| 3,882,971 A | 5/1975 | Peckham, Jr. |
| 3,989,124 A | 11/1976 | Fuji |
| 4,015,690 A | 4/1977 | Armstrong |
| 4,020,925 A | 5/1977 | Ryan et al. |
| 4,061,206 A | 12/1977 | Wood |
| 4,102,439 A | 7/1978 | Calderazzo |
| D281,874 S | 12/1985 | King |
| D295,847 S | 5/1988 | Everett |
| D310,199 S | 8/1990 | Herner |
| 5,107,965 A | 4/1992 | Yates |
| 5,364,250 A | 11/1994 | Aoki et al. |
| 5,431,257 A | 7/1995 | Rocca et al. |
| 5,501,301 A | 3/1996 | Nishimura |
| 5,564,531 A | 10/1996 | Lumpkin |
| 5,632,362 A | 5/1997 | Leitner |
| 5,775,466 A | 7/1998 | Banyas et al. |
| 5,813,501 A | 9/1998 | Terry, Sr. |
| 5,927,442 A | 7/1999 | Liao |
| 5,997,262 A | 12/1999 | Finkbeiner et al. |
| 6,098,486 A | 8/2000 | Liao |
| 6,164,153 A | 12/2000 | Scura |
| D436,334 S | 1/2001 | Takizawa |
| 6,386,328 B1 | 5/2002 | Chen |
| 6,615,955 B2 | 9/2003 | Jakovljevic |
| 6,634,467 B2 * | 10/2003 | Liu ................... B60T 11/046 188/24.16 |
| D495,635 S | 9/2004 | Everett |
| 6,884,049 B2 | 4/2005 | Hida et al. |
| 6,899,202 B1 | 5/2005 | McIntyre |
| 7,537,094 B1 | 5/2009 | Kato |
| D603,766 S | 11/2009 | Huang |
| D603,767 S | 11/2009 | Crippa et al. |
| 8,230,984 B2 | 7/2012 | Moore |
| 8,333,266 B2 | 12/2012 | Ouellet |
| D688,996 S | 9/2013 | Arbesman et al. |
| 8,960,378 B2 | 2/2015 | Moore |
| 9,759,277 B2 | 9/2017 | Kobayashi et al. |
| 10,215,243 B2 | 2/2019 | Riley et al. |
| 10,252,770 B2 | 4/2019 | Riley et al. |
| D879,687 S | 3/2020 | Remy et al. |
| 10,780,736 B2 | 9/2020 | Madhaven |
| 2002/0185349 A1* | 12/2002 | Jakovljevic ............. B62L 3/08 188/344 |
| 2005/0000756 A1 | 1/2005 | Biria |
| 2007/0227834 A1* | 10/2007 | Mieze ..................... B60T 13/02 188/2 R |
| 2007/0284203 A1* | 12/2007 | Tetsuka ................. B62L 3/023 188/344 |
| 2009/0302565 A1 | 12/2009 | Ouellet |
| 2010/0007112 A1 | 1/2010 | Ouellet |
| 2010/0051394 A1 | 3/2010 | Tsai |
| 2010/0230214 A1 | 9/2010 | Tseng |
| 2011/0000749 A1* | 1/2011 | Yamashita ............. B60T 7/102 411/395 |
| 2017/0151829 A1 | 6/2017 | Neutsch |
| 2017/0283000 A1 | 10/2017 | Huang et al. |

FOREIGN PATENT DOCUMENTS

| | | | |
|---|---|---|---|
| DE | 42 16 461 A1 | 11/1993 | |
| DE | 20309375 U1 * | 8/2003 | ............ B60T 11/046 |
| EP | 0 378 009 | 7/1990 | |
| EP | 0 533 950 | 3/1993 | |
| EP | 0 907 023 | 4/1999 | |
| EP | 1 266 820 | 12/2002 | |
| EP | 1 643 127 | 4/2006 | |
| GB | 2 003 563 | 3/1979 | |
| JP | H08-144964 A | 6/1996 | |
| JP | 2005-214140 A | 8/2005 | |
| JP | 2007-177735 A | 7/2007 | |
| JP | 2009-013832 A | 1/2009 | |
| JP | 3159551 U * | 5/2010 | |
| WO | WO 2011/075502 | 6/2011 | |

OTHER PUBLICATIONS

International Search Report and Written Opinion in Application No. PCT/US2010/060411, dated Feb. 22, 2011 in 8 pages.

* cited by examiner

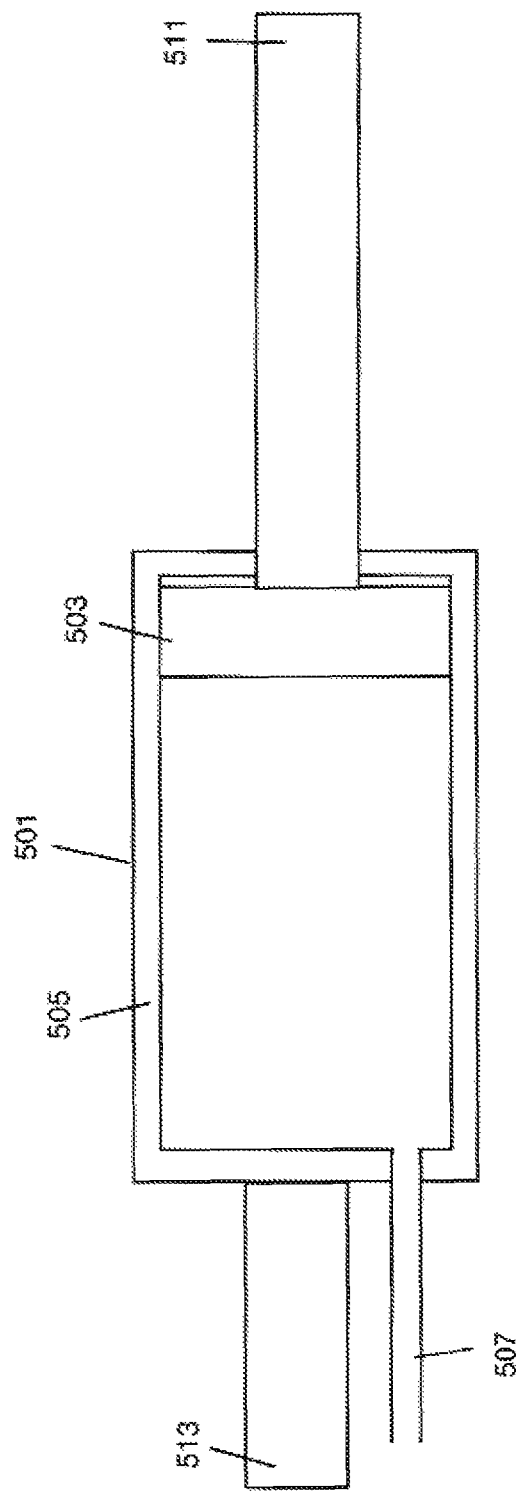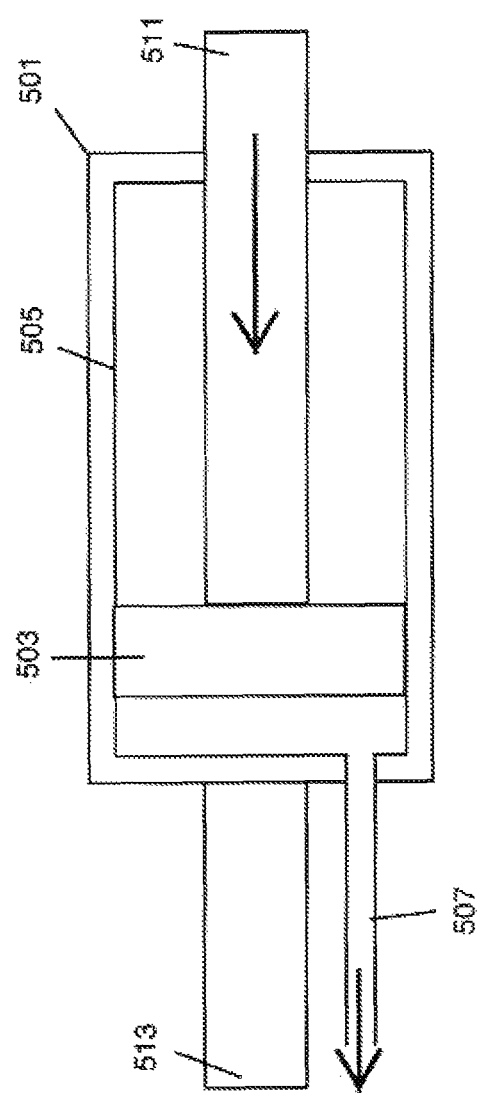

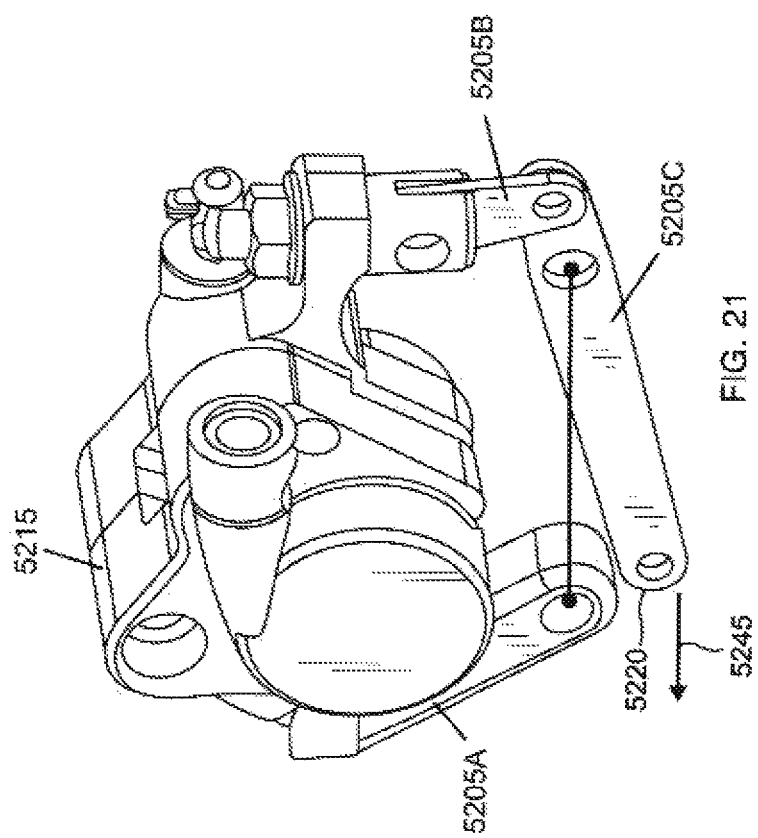

HYDRAULIC BRAKE SYSTEM AND APPARATUS

CROSS-REFERENCE TO RELATED APPLICATIONS

This patent application claims priority to U.S. Provisional Patent Application No. 62/871,279, "Hydraulic Brake System and Apparatus" filed Jul. 8, 2019. This patent application is also a continuation in part of U.S. patent application Ser. No. 16/379,514, "Hub and Disk Brake System and Apparatus" filed Apr. 9, 2019 which is a continuation of U.S. patent application Ser. No. 14/612,166, "Hub and Disk Brake System and Apparatus" filed Feb. 2, 2015, now issued as U.S. Pat. No. 10,252,770 on Apr. 9, 2019, which claims the benefit of U.S. Provisional Patent Application 61/934,538, filed Jan. 31, 2014. U.S. Patent Application Nos. 61/934,538, 62/871,279, Ser. Nos. 14/612,166, and 16/379,514 are all incorporated by reference in their entirety along with all other references cited in this application.

BACKGROUND

A two-wheeled vehicle is equipped with a brake system to slow or stop its moving by applying friction upon its wheels. A rider uses both hands to press two brake levers, fixed on the handlebar, to control a front and rear brake of the two-wheeled vehicle. However, it would be dangerous if the rider presses either one of the brake levers too hard to make the vehicle's wheel to be locked by the front or rear brake. It is uncontrollable and dangerous for a moving two-wheeled vehicle with one of its wheels being locked, e.g. the vehicle may skid on the ground. In the instance of a two-wheeled vehicle's tip over, the two-wheeled vehicle still moves with its front wheel being locked such that the rider may fall over beyond a handlebar of the two-wheeled vehicle when a rear wheel comes off the ground by a sufficient height. For the foregoing reasons, there is a need for preventing a moving two-wheeled vehicle from a tip-over or a wheel being locked.

BRIEF SUMMARY OF THE INVENTION

The present invention relates to a brake system and method. More particularly, the present invention relates to a brake system and method for a two-wheeled vehicle such as a bicycle or a scooter which can be human or electric powered. For simplicity, the vehicle can be described as a bicycle, however the described braking system can be used for human and engine or motor powered bicycles, scooters, and other vehicles. A braking system includes a rear and a front hydraulic disk brake. The rear brake may be a disc brake. A first hydraulic line filled with a hydraulic fluid is coupled to the front brake which is coupled to a hydraulic piston in a cylinder which is connected to the moveable structure coupled to a rear disk brake. When the rear brake is actuated, the moveable structure moves. The movement of the structure compresses the hydraulic piston into the cylinder which results in compressed hydraulic fluid in a second hydraulic line which actuates the front brake. The movement may include a translation, rotation, or both. If the rear wheel loses traction or is moved away from the ground, the rear disk no longer compresses the hydraulic piston in a cylinder which reduces the pressure in the hydraulic fluid in the second hydraulic line which deactivates the front brake which prevents the vehicle from flipping over due to a locked front brake.

In a specific embodiment, an apparatus includes a lever coupled to a rear hydraulic disk brake, a hydraulic lever is coupled an end of a first hydraulic tubing, an opposite end of the rear brake hydraulic tubing being coupled to a rear hydraulic brake, and a first end of a second hydraulic tubing coupled to a moveable portion of the rear brake and an opposite end of the second hydraulic tubing being coupled to a front hydraulic brake, wherein when the rear brake is actuated by the rear brake lever, the hydraulic fluid is forced through the second hydraulic tubing, thereby actuating the front brake.

In another specific embodiment, an apparatus includes a pivot point; a brake mount to attach a rear disc brake; and a lever arm extending away from the pivot point. The lever arm is coupled to a hydraulic piston in a cylinder. A second hydraulic tubing coupled to the cylinder and coupled to a front hydraulic brake, wherein when the rear disc brake is actuated, the lever arm compresses the piston within the cylinder, pressurizing the hydraulic fluid in the second hydraulic tubing to actuate the front brake.

In another specific embodiment, an apparatus includes a first link of a linkage and comprising a first joint, a second joint, and a hydraulic actuator attachment end, wherein the second joint connects to a first tab on a bicycle frame and is between the first joint and the hydraulic actuator attachment end; a second link of the linkage connected to the first joint and comprising a first mount, opposite the first joint, for a disc brake; and a third link of the linkage and comprising a fourth joint and a second mount, opposite the fourth joint, for the disc brake, wherein the fourth joint connects to a second tab on the bicycle frame. Movement of the rear brake linkages results in compression of the hydraulic piston in the cylinder which pressurizes the hydraulic fluid in the second hydraulic tubing to actuate the front brake.

In each of these examples, if the rear wheel loses traction or is moved away from the ground and the braking friction force of the rear tire against the ground decreases or is eliminated. This release of the rear brake force results in the rear disk brake no longer compressing the hydraulic piston in a cylinder which reduces the pressure in the hydraulic fluid in the second hydraulic line which deactivates or reduces the front brake force which prevents the vehicle from flipping over due to a locked front brake.

BRIEF DESCRIPTION OF THE FIGURES

The accompanying drawings are included to provide a further understanding of the invention, and are incorporated in and constitute a part of this specification. The drawings illustrate embodiments of the invention and, together with the description, serve to explain the principles of the invention. In the drawings.

FIGS. 6 and 7 illustrate hydraulic actuators;

FIGS. 19-21 illustrate right side perspective views of rear disk brakes mounted on to rotating linkages;

DETAILED DESCRIPTION

Figure 1:
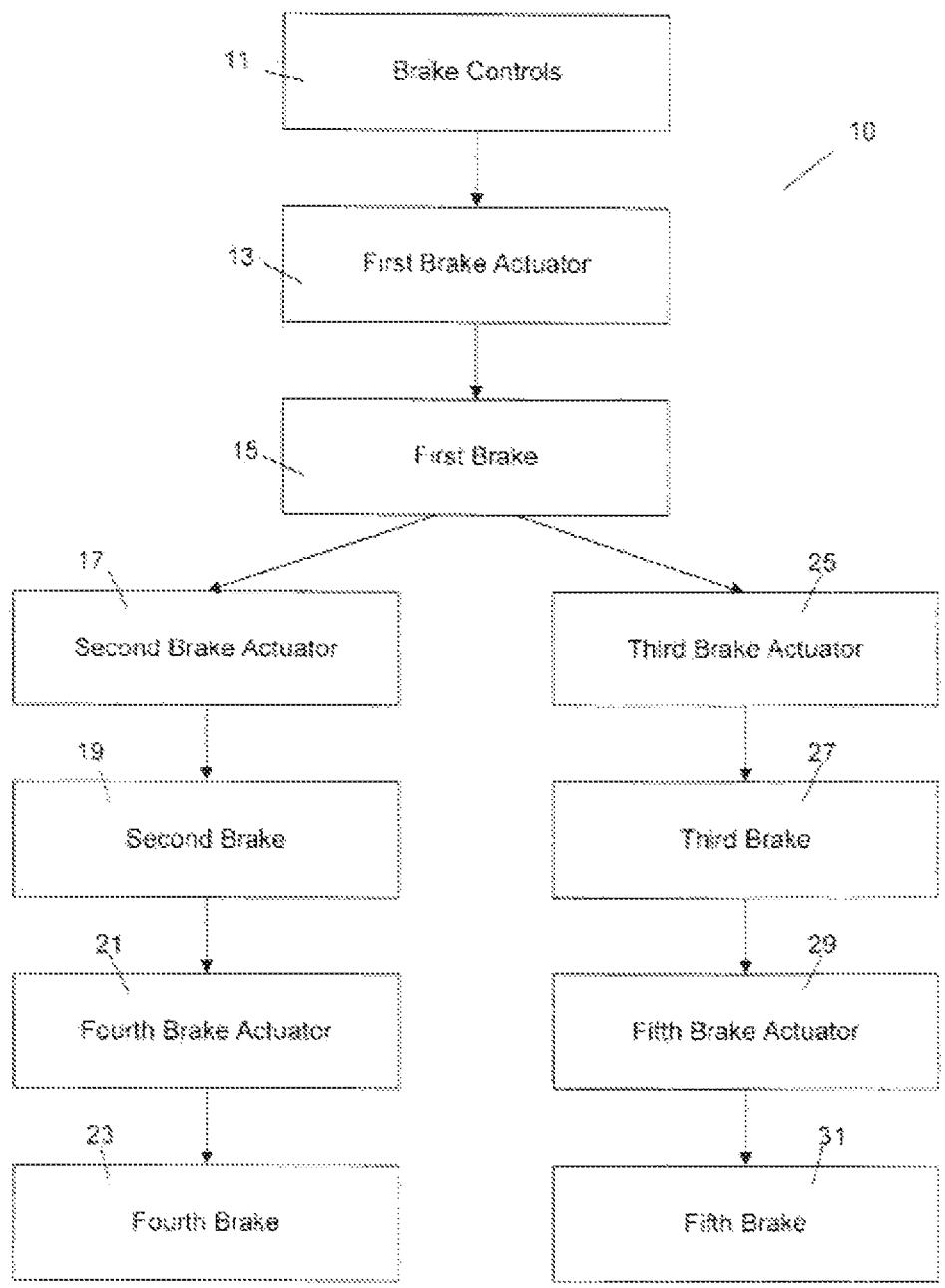
FIGS. 1-3 illustrate diagrams of embodiments of the inventive braking system.

Reference will now be made in detail to the present embodiments of the invention, examples of which are illustrated in the accompanying drawings. Wherever possible, the same reference numbers are used in the drawings and the description to refer to the same or like parts. With reference to FIG. 1, the present invention is directed towards a brake system 10 that can be used for bicycles and other vehicles supported by multiple wheels. The inventive braking system 10 that can include two or more brake mechanisms 15, 19, 23, 27, 31 that are actuated by one or more brake controls 11, such as hand brake levers or foot brake pedals. When the user squeezes the one or more brake levers or steps on the foot brake pedal, a first brake actuator 13 actuates the first brake 15. The friction force of a disk brake caliper pad in the first brake 15 against a rotating disk brake rotor structure then actuates a second brake actuator 17 which can be a hydraulic actuator coupled to the second disk brake 19 so that both brakes 15, 19 are engaged to slow or stop the vehicle. The first brake 15 that is directly controlled by the brake controls 11 and can be mounted on any brake on a vehicle.

It is also possible for the first brake to control multiple brake actuators 17, 25 which can each be hydraulic actuators. For example, a first (rear) brake 15 can be coupled to a second (front left) hydraulic brake actuator 19 can control the second (front left) brake 19 and a third (front right) hydraulic brake actuator 25 can control the third (front right) brake 27 of the vehicle. For example, the brake controls 11 can actuate the first brake actuator 13 which is coupled to the first brake 15. The braking friction of the first brake 15 can actuate a second brake actuator 17 coupled to the second brake 19. The braking friction of the second brake 19 can actuate a fourth brake actuator 21 coupled to a fourth brake 23. Similarly, the braking friction of the third brake 27 can actuate the fifth brake actuator 29 coupled to a fifth brake 31. This sequential brake actuator configuration can continue to three or more brakes.

The following description is primarily directed towards a two wheeled powered bicycle or scooter. In an embodiment, the first brake is the rear hydraulic disk brake and the second brake is the front hydraulic disk brake. The disclosed designs and operating principles can be applied to any multiple wheeled vehicle and the scope of the application is intended to cover the inventive braking system applied to all multiple wheeled vehicle configurations.

Normal human and motor powered bicycle and scooter brakes can include two hand levers which are used to individually control a front brake and a rear brake. A problem with existing brake systems is that the bicycle rider must be careful when applying the brakes because if the front brake is actuated to the point that the front wheel is locked and stops rotating, the stopping force can flip the rider off of the bicycle. There are several techniques for efficient braking on a two-brake bicycle. The one most commonly taught is the 25-75 technique. This method entails supplying 75% of the stopping power to the front brake, and about 25% of the power to the rear. Since the bicycle's deceleration causes a transfer of weight to the front wheel, there is much more traction on the front wheel. However, excessive front braking force can cause skidding of the front tire which can cause the bike to flip forward over the front wheel and probably injury to the rider. Excessive rear braking force can cause skidding, but will not result in the bike flipping.

The present invention is directed towards a brake system and apparatus which allows the rider to quickly stop the bicycle or other vehicle very quickly, but prevents the front wheel from locking up or being slowed too quickly. The brake system is also compatible with existing brake designs and can be produced in a very economical manner so that bicycle riders will not have to pay a significant amount of money for these very important safety features. In an embodiment, the inventive brake system can be retrofitted onto existing bicycle brakes and in other embodiments, the inventive brake system can be incorporated into the designs of the brakes.

A bicycle has a frame on which a front wheel and a rear wheel are mounted. In an embodiment, one or two brake levers are fastened on a handlebar and the lever(s) are connected to a rear brake actuator which is coupled to a rear brake. A hydraulic actuator is coupled between the front brake and the rear brake. The rear brake can include one or two disk brake pad assemblies. When the rear brake is actuated by the rear brake lever, a portion of the rotating rear disk brake rotor is compressed between two or more brake pads and the friction generated by the direct contact of the brake pad with the rotating braking surface slows the rotational velocity of the rear wheel which is coupled to the rear disk brake rotor. One or more of the brake pads in the rear brake can include a coupling to a hydraulic actuator. In response to the direct contact between the disk brake pads with the rotating disk brake rotor braking surface. The friction between the rear disk brake caliper and the rotating rear disk brake rotor causes movement of the rear brake caliper and this movement actuates the hydraulic actuator which pressurizes hydraulic fluid in a hydraulic tubing which actuates the front brake and slows the rotation of the front wheel. When the rear brake is released, the disk brake pads are pulled away from the rear disk brake rotor and the hydraulic actuator is no longer compressed which releases the front brake.

If the braking occurs quickly, the weight of the rider can shift forward and the deceleration force applied by the front wheel at the point of contact with the ground can cause the rear wheel to be lifted from the ground. This loss of surface contact will reduce or eliminate the rotational force applied by the ground to the rear wheel. Because the actuation force applied to the front brake is proportional to the rotational force of the rear wheel, the braking force applied to the front wheel will also be reduced until the rear wheel regains contact with the ground. The contact will generate a rotational force to the rear wheel and the rear disk brake pads will be actuated again and apply a force to the hydraulic actuator which will again actuate the front brake. By automatically detecting the rotational force applied to the rear wheel and adjusting the front brake force proportionally, the inventive braking system and brake pad assembly prevents the front wheel from skidding which allows the rider to remain in control of the bicycle even if excessive braking forces are applied. Since the front brake 106 force is controlled to the rear wheel rotational force, a rider can increase the braking force by moving as much body weight over the rear wheel as possible during braking. However, even if the rider shifts his or her weight forward while riding, hard braking will not cause the bicycle to stop in a manner that would flip the bicycle over the front wheel.

Figure 2:
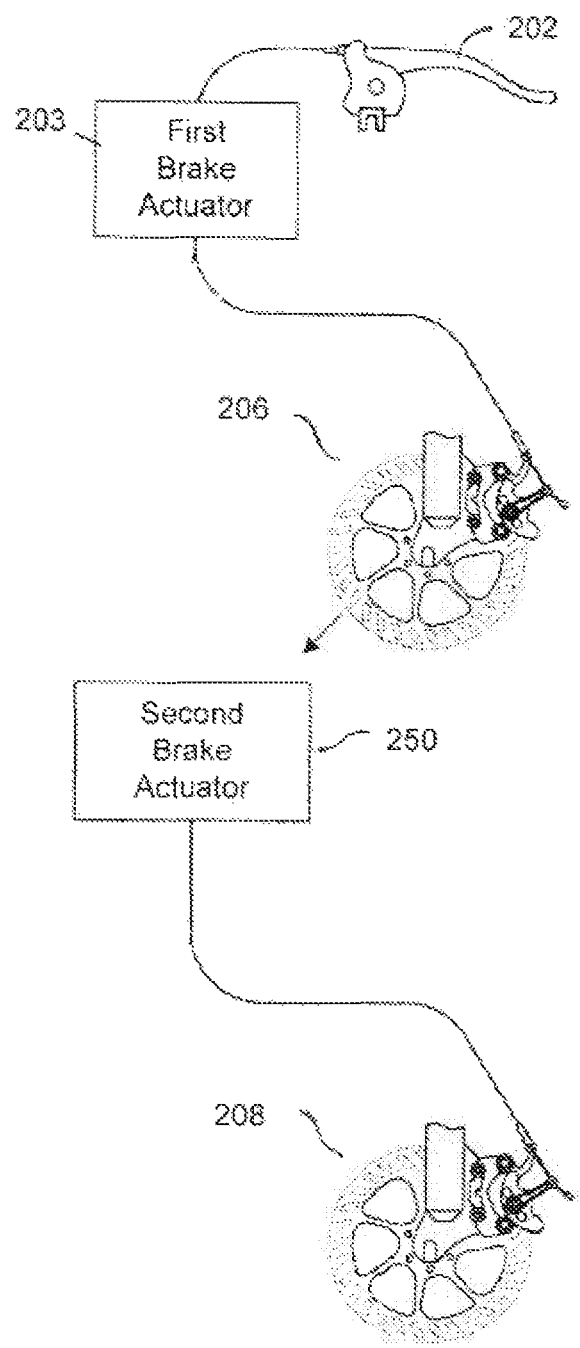

FIG. 2 illustrates a brake system according to one embodiment of this invention. The brake system can include a brake lever(s) 202, a first brake actuator 203, a first disk brake 206, a second brake actuator 250 and a second disc brake 206. When the brake lever 202 is squeezed, it transfers a braking force to the first brake actuator 203 which applies the first disk brake 206. The friction force of the disk brake pad assembly in the first brake 206 transmits a compression force to the second brake actuator 250 which can be a hydraulic actuator which actuates the second disk brake 208.

Figure 3:
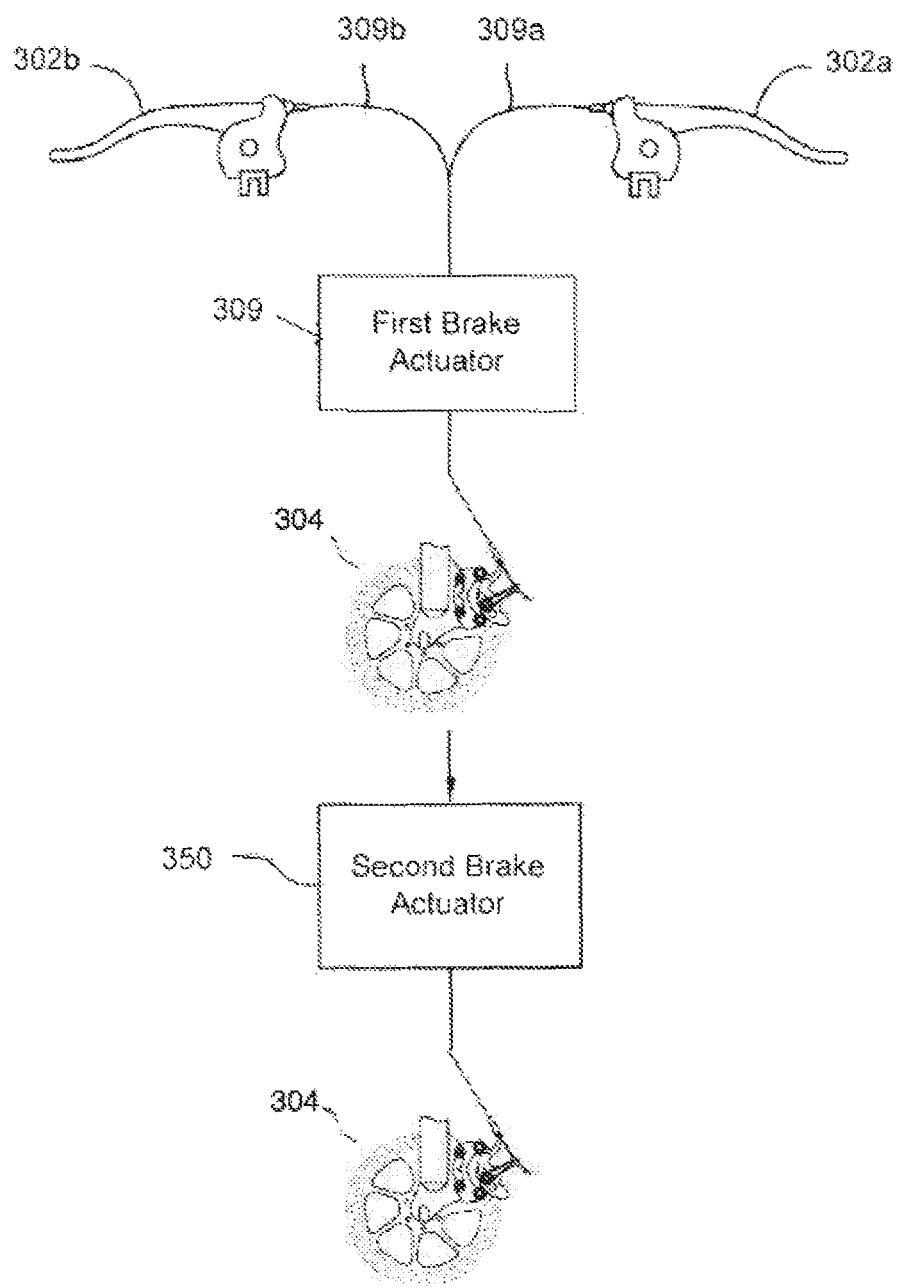

FIG. 3 illustrates a brake system according to another embodiment of this invention. The brake system may include two brake levers 302a, 302b, a first brake actuator 309, a first disk brake 304, a second brake actuator 350 and a second disk brake 306. In this embodiment, two brake levers 302a, 302b are used to actuate the first disk brake 304. In an embodiment, the first brake actuator 309 can be hydraulic that can be split into a first hydraulic tubing 309a and a second hydraulic tubing 309b which are pressurized by actuation of a first brake lever 302a and/or a second brake lever 302b by a user's hands. In this configuration, a rider may use both hands to apply brake forces on the two brake levers 302a, 302b to actuate the rear brake 304.

Figure 4:
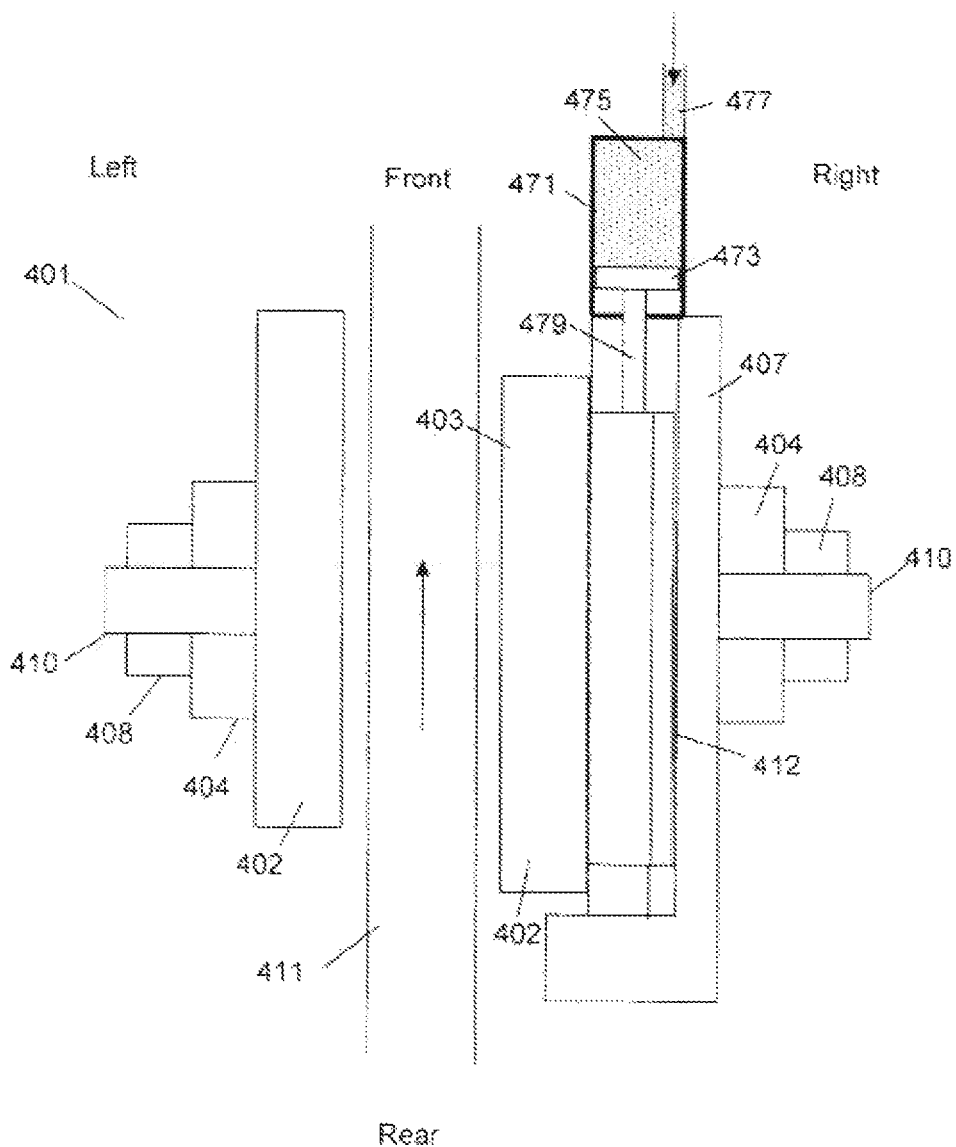
FIGS. 4 and 5 illustrate top views of a brake according to an embodiment of the invention.
Figure 5:
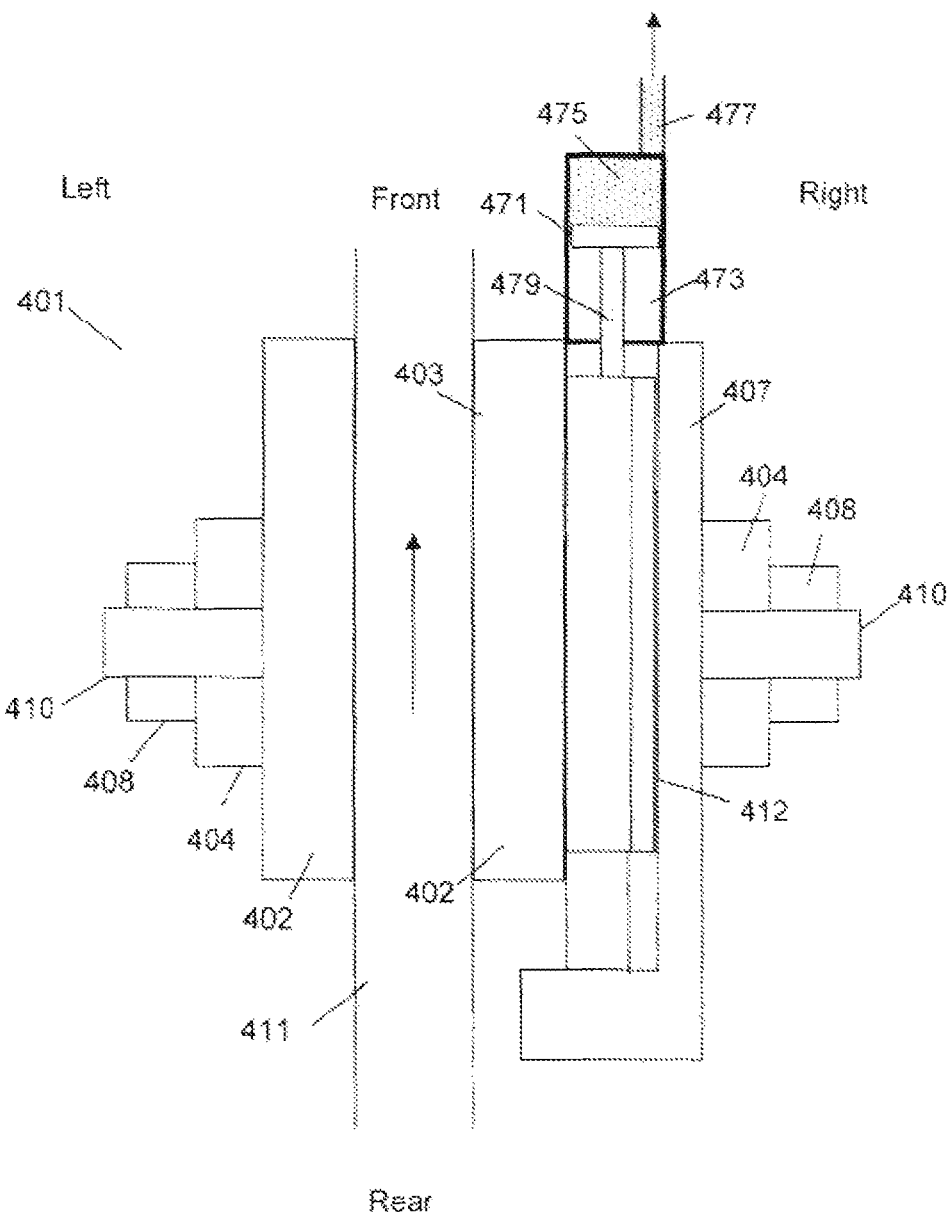

With reference to FIGS. 4 and 5, in other embodiments, a top view of a rear hydraulic brake assembly is illustrated. The disk brake 401 can include a slider assembly 403 and a guide 407 that are coupled to an arm 404 of the first brake 401. The brake pad assembly 414 can include a slider assembly 403 that can slide within the guide 407. The brake 401 can be mounted around a portion of the first disk brake rotor with the brake pads 402 aligned on opposite sides of a first disk brake rotor 411. When the vehicle moves forward, the upper portion of the disk brake rotor 411 also moves forward. The brake 401 can have two brake pads 402. In an embodiment, the brake pad 402 on the right side is coupled to a slider assembly 403 that moves within a guide 407. The guide 407 can be coupled to a mounting rod 410 which is secured to the brake arm 404. The slider assembly 403 can include a brake pad 402 which can be compressed against the rotating rim 411. The brake pad assembly 403 can also include a layer of lubricious material 412 such as Nylatron, Teflon, graphite or other low coefficient of friction and high compression strength materials. Alternatively, the brake assembly 403 components can be made of these low friction materials.

The orientation of the slider assembly 403, brake pad 402 and guide 407 on the bicycle can depend upon the position of the brake 401 on the wheel. If the brake 401 is located on the upper half of the disk brake rotor 411, the described and illustrated positions are correct. However, if the brake is on the lower half of the disk brake rotor 411, the "front" and "back" of the bicycle can be reversed.

The slider assembly 403 can also be coupled to a second brake actuator. In an embodiment, the second brake actuator can be a hydraulic actuator having an end fitting 124 which can have a stepped cylindrical design with a first smaller diameter and a larger end diameter. The fitting 124 can engage an open hole coupling mechanism 132 on the slider 403. The hole in the coupling mechanism 132 can be slightly larger than the first smaller diameter and smaller than the larger end diameter so that the fitting 124 is securely connected to the coupling mechanism 132.

The brake pad 402 on the left side of the disk brake rotor 411 can be a normal brake pad. In an embodiment, the brake pad 402 can be coupled to a mount 410 that extends away from the disk brake rotor 411 braking surface. The brake pad 402 can be secured to the brake caliper 404 by a nut 408 that is screwed onto the mounting rod 410. When the brake 401 is not actuated, the brake pads 402 are pulled away from the disk brake rotor 411 by springs in the brake 401.

The rear brake 401 is coupled to a brake actuator which can be a brake lever(s). When the lever(s) is actuated, the inventive brake pads 402 is pressed against the disk brake rotor 411 which is coupled to the rear wheel to slow or stop the rear wheel rotation. The slider assembly 403 and guide 407 are aligned with the brake pad 402 and the disk brake rotor 411 so that the movement of the slider 403 and brake pad 402 are also aligned with the disk brake rotor 411.

The hydraulic pressure can be proportional to the friction force of the brake pad 402 against the disk brake rotor 411. A higher braking force applied to the first brake will result in a higher braking force applied to the second brake through the hydraulic tubing 477.

However, if the rear wheel loses traction with the road, the disk brake rotor 411 may stop rotating and the friction force that creates the hydraulic pressure and the brake force applied to the second brake are reduced until the rear wheel regains traction and begins to rotate the disk brake rotor 411 again. Since the rear wheel may lose traction when excessive braking is applied to the front brake the rear wheel is starting to lift off the ground, this system effectively functions as an anti-locking brake system.

The coefficient of friction of the brake pad 402 sliding against the rim can depend upon the brake pad 402 and disk brake rotor 411 materials. The disk brake rotor 411 can be made of aluminum, carbon fiber, titanium, steel, and other metals or metal alloys. The brake pad 402 can be a plastic, rubber, metal, carbon composites or other high coefficient of friction material or attached in any other suitable manner to a brake support structure. The slider brake support structure and brake pad 402 can also be configured to apply uniform pressure to the contact areas where the brake pads contact the disk brake rotor 411.

Figure 23:
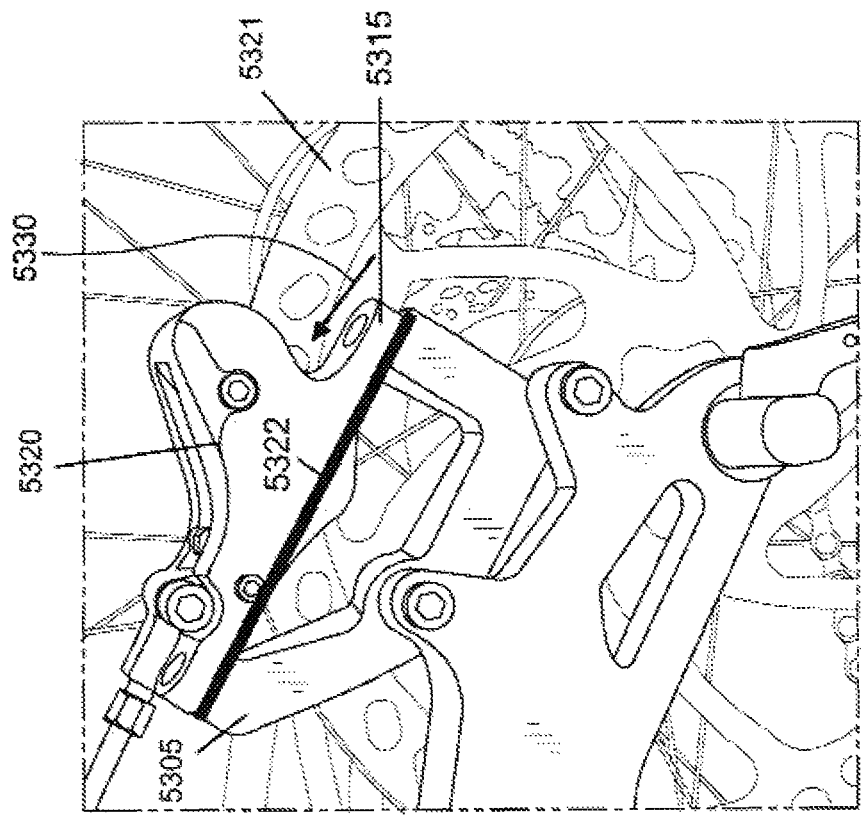
FIGS. 22-24 illustrate side perspective views of a rear disk brake on a linear movement track assembly.

The rear brake assembly can be coupled to a hydraulic cylinder 471 filled with hydraulic fluid 475. The cylinder 471 can be coupled to the guide 407 and the slide assembly 403 can be coupled to a piston rod 479 that is attached to a piston 473 that can move within the cylinder 471. One end of the brake hydraulic tubing 477 is coupled to a cylinder 471 and the opposite end is coupled to the second brake. With reference to FIG. 23, a spring in the second brake pressurizes the hydraulic fluid 475 pressing the piston 473 towards the back of the cylinder 471. The hydraulic brake system can be a disc brake. In the normal position, the brake shoe 402 is not in contact with the disk brake rotor 411.

With reference to FIG. 5, in the braking position the brake pads 402 are pressed against the moving disk brake rotor 411. The slider 403 moves forward due to the friction of the brake pad 402 against the rim 411. The slider 403 pushes the rod 479 and the piston 471 within the cylinder 471 pressuring the hydraulic fluid 475. The pressurized hydraulic fluid 475 exits the cylinder 471 and flows through the hydraulic tubing 477 to actuate a second hydraulic brake coupled to a front wheel. If the disk brake rotor 411 stops rotating due to the rear wheel's lack of contact with the road, the friction force and the force moving the slider 403 forward will decrease. The forces on the piston 473 will decrease and the hydraulic fluid 475 pressure will also decrease. This reduced hydraulic fluid 475 pressure in the hydraulic tubing 477 will reduce the braking force on the second brake until the rear wheel regains traction on the road and the disk brake rotor 411 starts rotating again.

In many bicycles, hydraulic systems are used with disk brakes. Because the disk brakes use a disk rotor rather than a rim as the braking surface, the brake pad can be any geometric shape that provides sufficient surface area to stop the rotation of the disk rotor. Because the disk brake pad is located much closer to the center of rotation, the radial position of the disk brake pad may shift as the slider moves within the guide if the path is linear. In an embodiment, the slider assembly and guide can be configured with an arched path that matches the disk rotor. This configuration may allow the disk brake pad to maintain a constant radial position against the brake rotor regardless of the position of the slider assembly within the guide. In the disk brake embodiment, the second brake actuator can be a hydraulic system or any other braking mechanism that can be actuated by the movement of the slider assembly in the guide.

The inventive brake system and apparatus are related to an anti-locking system for bicycles and other wheeled vehicles such as motorcycles. As discussed in the applicant's other patents and patent applications, the basic principle of the anti-locking brake system is that the user only actuates the rear brake and a front brake actuator is coupled directly between the rear brake and the front brake. Thus, the user does not have the ability to independently actuate the front brake. When the rear brake is actuated, the friction force between the rear tire and the ground actuates the front brake actuator which causes the front brake to stop or slow the front wheel.

As discussed, the rear brake can be coupled to a hydraulic actuator. FIGS. 6 and 7 illustrate an embodiment of a hydraulic actuator 501 which has a piston 503 that slides within a cylinder 505 that is filled with a hydraulic fluid. The hydraulic actuator 501 has a first end 511 and a second end 513. In FIG. 6, the piston 503 is adjacent to one end of the cylinder 505 where the hydraulic actuator 501 is not compressed with substantial pressure or force compressing the first end 511 towards the second end 513. In this retracted state, the hydraulic fluid does not flow through the hydraulic tubing 507 to a front hydraulic brake which is not shown. In FIG. 7, the first end 511 is pressed towards the second end 513 which moves the piston 503 within the cylinder 505 which results in hydraulic fluid flowing through the hydraulic tubing 507 which can be could to the front hydraulic brake. One end 511 of the hydraulic actuator 501 is coupled to a rear brake mechanism or a linkage coupled to the rear brake mechanism and a second end 513 can be coupled to a portion of the frame of the vehicle. A center axis of the hydraulic actuator 501 can be aligned with a plane defined by the rear brake disk rotor. The second end 513 can be coupled to a hinge which can be aligned with a plane defined by the rear brake disk rotor and the rotational axis of the hinge can be perpendicular to the plane defined by the rear brake disk rotor.

Figure 8:
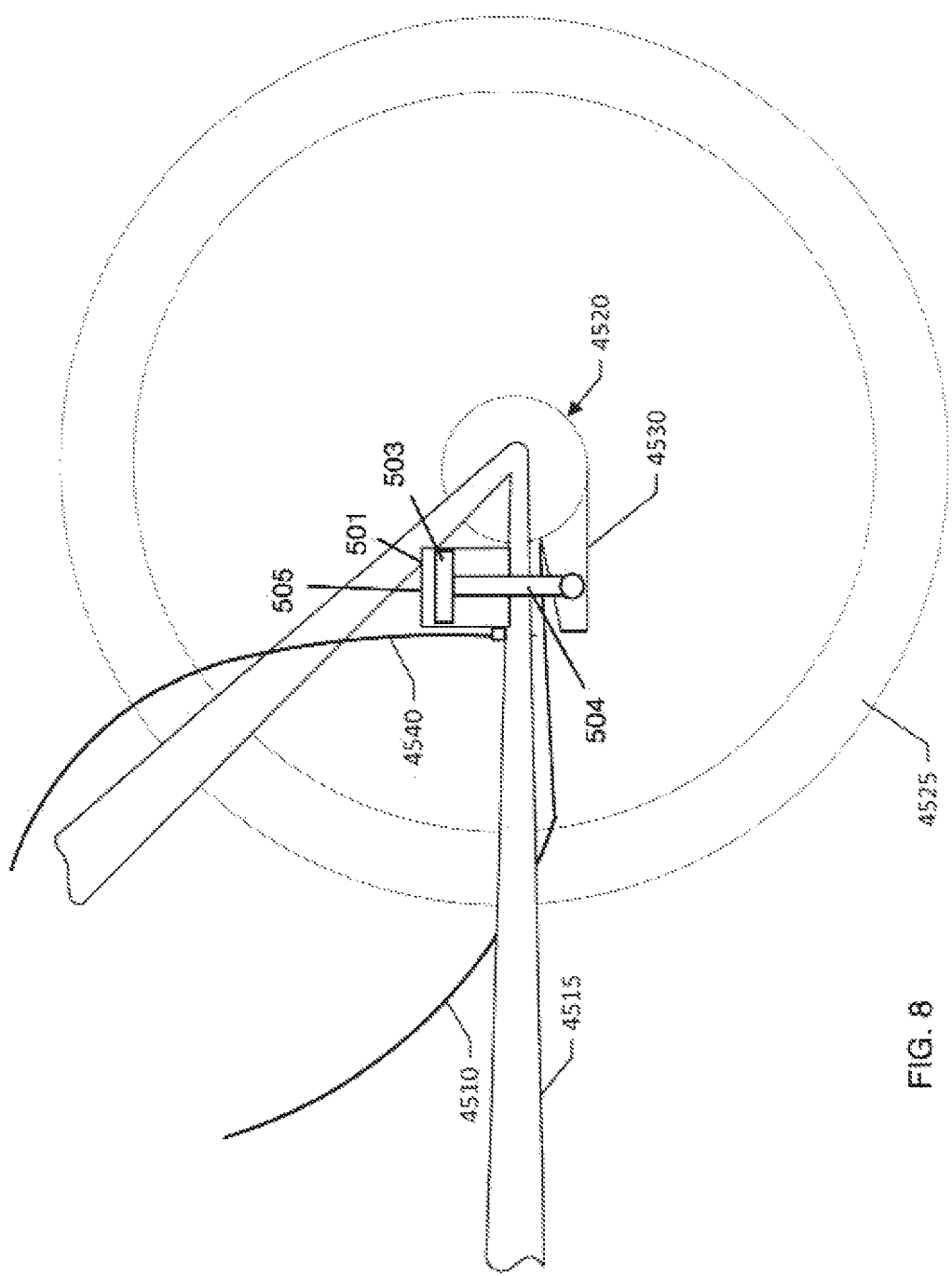
FIG. 8 illustrates a side view of a rear brake system.

FIG. 8 illustrates another embodiment of the rear disk brake system. The rear brake hydraulic tubing 4510 can be placed under the left rear chain stay 4515 and actuates the rear disk brake 4520. When the rear brake is actuated the friction of the rear wheel 4525 against the ground causes a rear brake lever 4530 coupled to a rotating portion of the read disk brake 4520 to rotate counter clockwise. In the illustrated embodiment, a hydraulic actuator 501 includes a hydraulic piston 503 and a piston rod 504 coupled to a hydraulic piston 503 that sliding within a hydraulic cylinder 501. Hydraulic fluid is in the hydraulic cylinder 501 below the piston 503 and air is above the piston 503 in the cylinder 501. The front brake hydraulic tubing 4540 is coupled to a hydraulic cylinder 505 which is coupled to the left chain stay 4515. In FIG. 8, the piston 503 is in the unactuated position at the top of the cylinder 505. When the rear brake 4520 is actuated, the rear brake lever 4530 rotates downward in a counter clockwise direction. The rear brake lever 4530 is coupled to the end of the piston rod 504 of the hydraulic actuator 501 and pulls the hydraulic piston 503 down within the cylinder 505 and the movement of the piston 503 in the cylinder 505 compresses the hydraulic fluid in the lower portion of the cylinder 505. The hydraulic fluid flows through the front brake tubing 4540 which is coupled to and actuates a front wheel hydraulic brake. The rear brake lever 4530 can have a limited rotational or movement range which stops when or before the piston 503 travels to the bottom end of the cylinder 501 which may be rigidly coupled to a left rear chain stay 4515 of the frame with adjustable fasteners such as bolts. If the rear wheel 4525 loses braking traction, the torque applied to the disk brake rotor 4520 is reduced and the downward force of the brake lever 4530 against the piston rod 504 and piston 503. This rear brake friction force reduction results in the brake lever 4530 rotating upward which reduces the hydraulic pressure applied by the hydraulic actuator 501 with hydraulic fluid flowing back into the cylinder 501 and the actuation force applied to the front brake is reduced.

In FIG. 8, the hydraulic actuator 501 is actuated by pulling the piston rod 504 from the bottom of the cylinder 505. In other embodiments, a different hydraulic actuator configuration such as the shown in FIGS. 6 and 7 can be used where the actuator is actuated by pressing the piston rod into the hydraulic cylinder. When the rear brake is actuated, the rear brake lever 4530 can rotate downward and compress the piston rod and piston into the cylinder which causes the hydraulic fluid to flow through the hydraulic tubing coupled to the front hydraulic brake.

Figure 9:
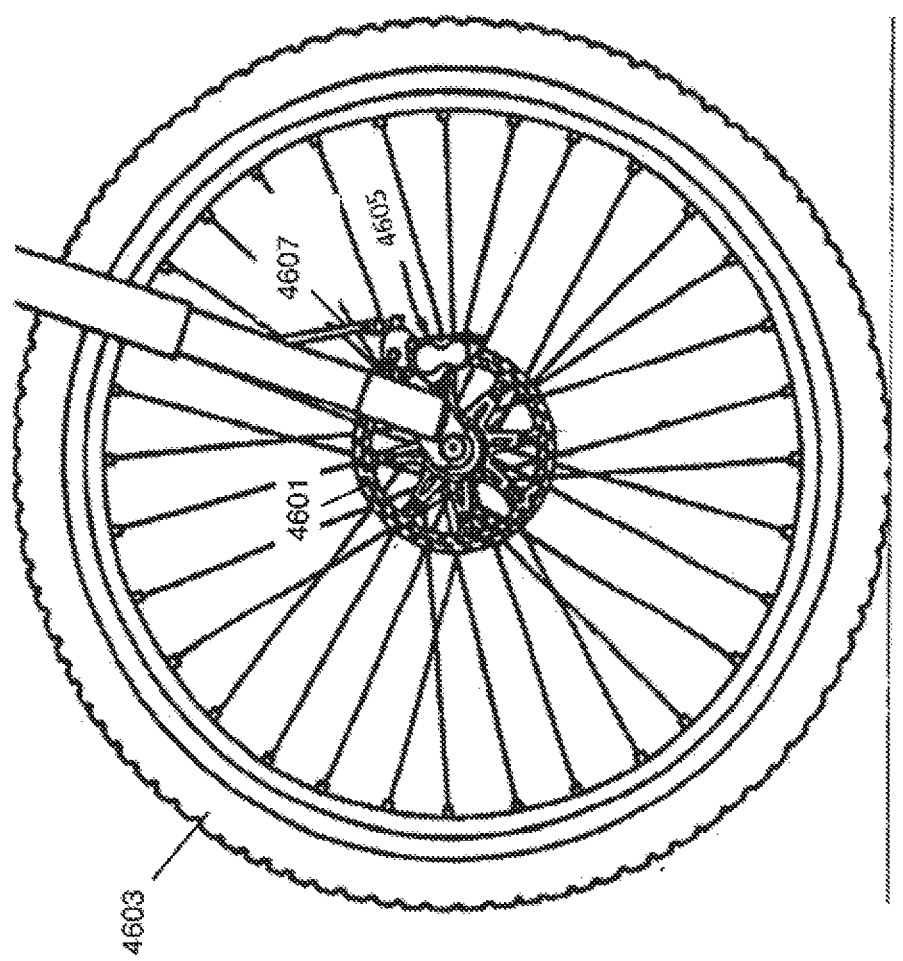
FIG. 9 illustrates a side view of a front brake.

FIG. 9 illustrates a front hydraulic brake 4605 which slows and/or stops the rotation of a front disk rotor 4601 and a front wheel 4603. The front hydraulic tubing 4607 is coupled to the hydraulic actuator that is actuated by a lever coupled to the rear brake. As discussed, when the hydraulic actuator is actuated by the rear wheel brake, the hydraulic fluid flows through the hydraulic tubing 4607 to actuate the front hydraulic brake 4605. When the rear wheel loses braking traction and the hydraulic actuator is released, the hydraulic fluid flows back through the hydraulic tubing 4607 to the cylinder in the hydraulic actuator and the hydraulic fluid pressure is reduced and the front hydraulic brake 4605 is released. In the manner described above, the front brake 4605 and front wheel 4603 will not lock up resulting in the vehicle flipping over the front wheel 4603.

Figure 10:
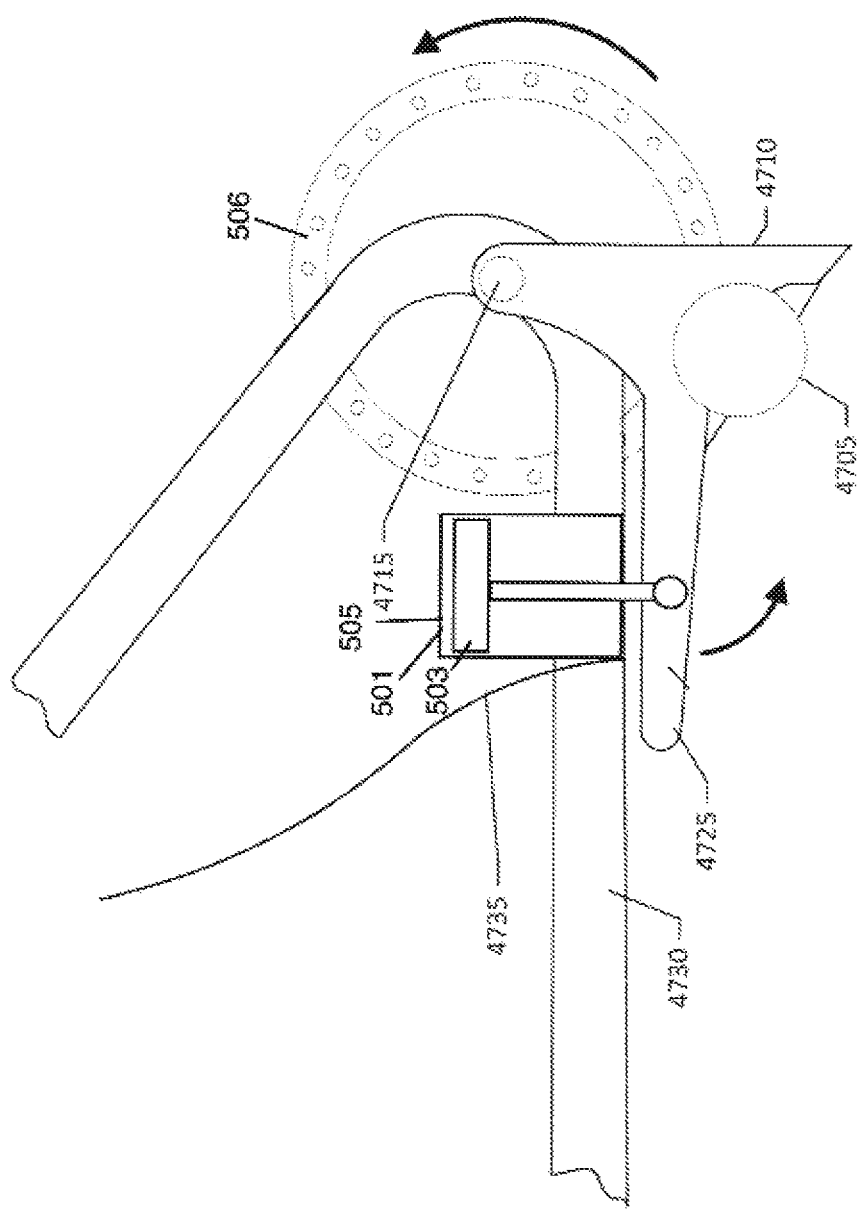
FIG. 10 illustrates a side view of a rear disk brake system.

FIG. 10 illustrates another embodiment of an anti-locking disk brake system. A rear portion of a bike is illustrated with a rear disk brake 4705. The rear disk brake 4705 is mounted on a rear brake assembly 4710 that rotates about a pivot point 4715 which can be aligned with the rear hub axle so that any counter clockwise rotation will keep the pads of the rear brake 4705 can maintain a proper radial alignment with the rear disk 506. Because the brake surface of the rear disk 506 can be narrow, the alignment of the pads on the rear brake 4705 can be very important. While the rear brake assembly 4710 is shown as being mounted to a pivot point 4715, in other embodiments, the rear brake assembly 4710 can be mounted to a linkage system which keeps the pads of the rear brake 4705 can maintain a proper radial alignment with the rear disk 506. The rear brake assembly 4710 can include mounting holes for the rear disk brake 4705 and a lever arm 4725 that can extend forward from the rear wheel axle under the left rear chain stay 4730.

The hydraulic actuator 501 can be mounted to the left chain stay 4730 with the piston 503 coupled to the lever arm 4725. FIG. 10 illustrates the actuator in the non-actuated position with the piston 503 in the upper portion of the cylinder 505 with hydraulic fluid under the piston 503 and air above the piston 503. When the rear brake 4705 is actuated and applies a friction force on the rotating rear disk 506 which causes the rear brake assembly 4710 to rotate with the rear disk 506 in a downward counter clockwise direction. The lever arm 4725 also rotates downward with the rear brake 4705 in a counter clockwise direction and pulls the piston 503 down within the cylinder 505. The piston 503 movement pressurizes the hydraulic fluid in the cylinder 505 which flows through the hydraulic tubing 4735 to actuate the front hydraulic brake. When the rear brake 4705 is released from the rear disk 506 and/or the rear wheel lifts off of the ground the rotational force of the rear disk 506 is released and the rotational force on the lever arm 4725 from the rotating rear disk 506 is reduced. The lever arm 4725 no longer pulls down on the piston 503 which causes the piston 503 to move up within the cylinder 505 and the hydraulic fluid flows from the front brake into the hydraulic tubing 4735 and into the cylinder 505. The movement of the hydraulic pressure out of the front brake releases the front brake on the front wheel which prevents the locking up of the front wheel.

Figure 11:
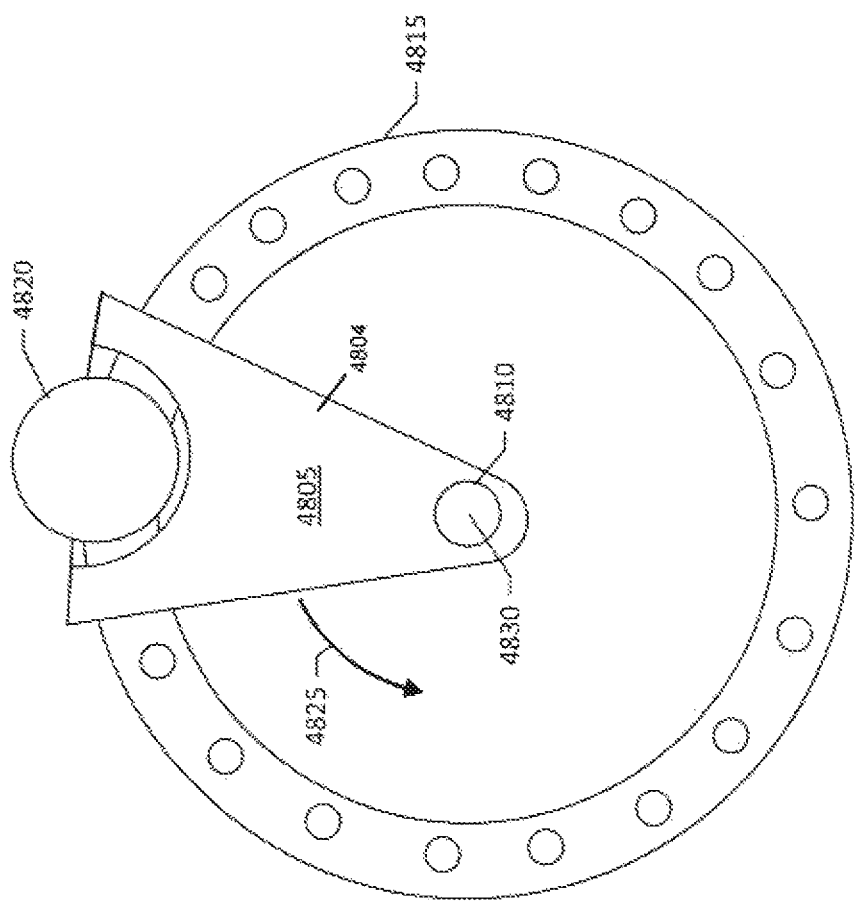
FIG. 11 illustrates a side view of a rear disk brake.

FIG. 11 illustrates a view of an embodiment of the rear brake assembly 4805 mounted on a rear hub 4810 of a rear wheel. The rear brake assembly 4805 can include a rear disk brake rotor 4815 and a rear disk brake 4820 mounted on a rear brake arm 4804. The hydraulic actuator can be coupled to the rear brake arm 4804 and the front brake housing can be coupled to the chain stay or other portion of the frame. When the brakes are not actuated the rear brake arm 4804 the hydraulic actuator used to actuate the front brake may not be in compression or in tension. When the rear brake is actuated, the rear brake assembly 4805 apply a friction force against the rotating rear disk brake rotor 4815 and the rear brake arm 4804 will rotate counter clockwise 4825 (looking at the left side) relative to the frame of the vehicle about a pivot point 4830. This rotation of the rear brake arm 4804 lever will actuate the hydraulic actuator which will actuate the front brake. If the rear wheel loses contact with the ground or if the rear brake is released, the rear brake assembly 4805 will be able to rotate clockwise and the hydraulic pressure applied to the front brake will be relieved which will prevent the front brake from locking the front wheel.

Figure 12:
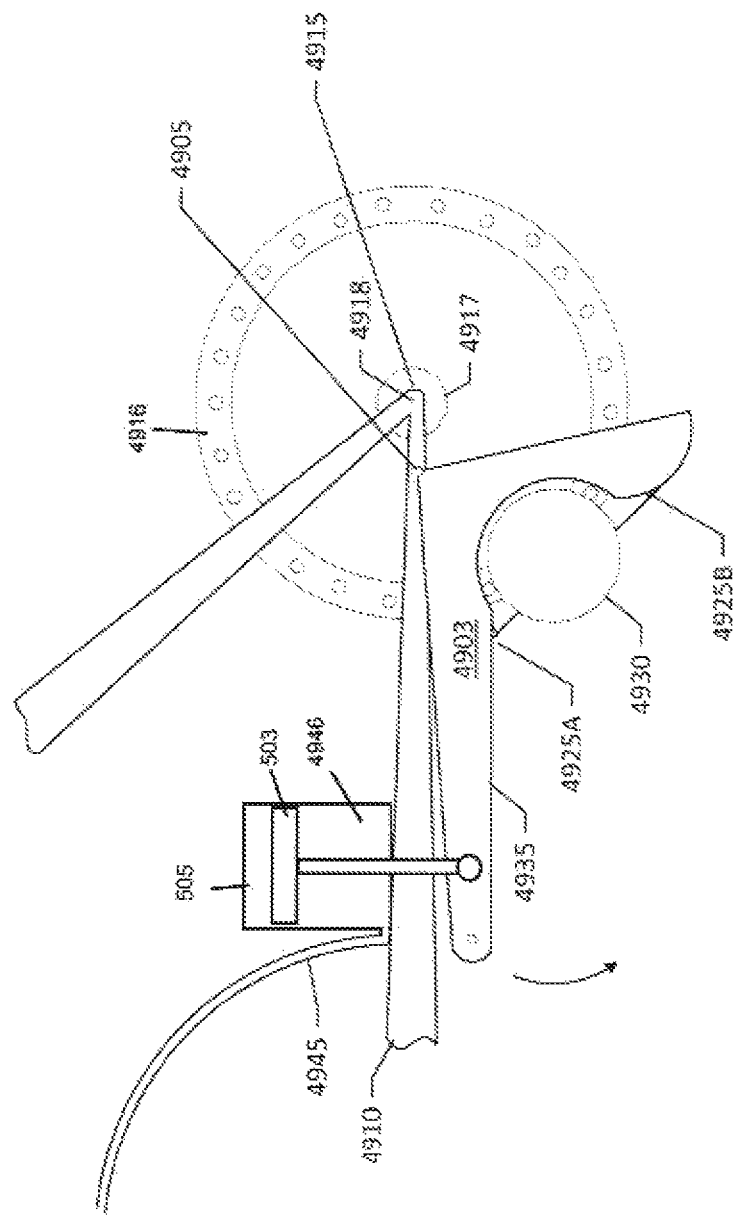
FIG. 12 illustrate a side view of a rear disk brake system.

FIG. 12 illustrates another embodiment of the rear disk brake system. In this embodiment, the rear brake structure assembly 4903 is coupled to a rotational mechanism at a pivot point 4905 on the left chain stay 4910 which is away from the center axis 4915 of the rear hub 4917 and may be a less complicated rotational bearing. The pivot point 4905 can be a rotational mechanism that may be rigidly attached to the frame by any suitable fastening means such as brazing or welding which allows the rear brake structure assembly 4903 to rotate about the pivot point 4905 around an axis that is parallel with the axis of rotation of the rear brake disk 4916. The rear hub 4917 is secured in the frame dropouts 4918 which may be horizontal dropouts or vertical dropouts. The rear brake structure 4903 can include threaded mounting holes 4925A and 4925B for mounting a standard rear disc brake 4930 and a lever arm 4935 that can extend under the left rear chain stay 4910. The rear disk brake system can have an adjustable mechanical advantage can be provided based on, for example, a connection point of the actuator 4946 to the lever arm 4935. The hydraulic actuator 4946 can have a cylinder 505 mounted to the left chain stay 4910 and a piston 503 coupled to the lever arm 4935. The force is proportional to the distance between the pivot point 4905 and the actuator 4946. The movement of the lever arm 4935 will generate more force when the hydraulic actuator 4946 is connected to the lever arm 4935 closer to the pivot point 4905 than when the connection is further from the pivot point 4905. In an embodiment, the When the rear disc brake 4930 is actuated, the lever 4935 rotates and the hydraulic fluid in the actuator 501 is pressurized to actuate the front disc brake. The rear disc brake 4930 may be a conventional hydraulic or mechanical disc brake. The front brake mechanism and front brake actuation can be substantially the same as described above.

The rear disc brake 4930 can be actuated by increased hydraulic fluid pressure from a rear brake lever or any other suitable rear brake actuation means. Friction between the ground and the rear wheel can result in increased hydraulic pressure generated by the hydraulic actuator 4946 which causes hydraulic fluid to flow into the hydraulic tubing 4945 which can actuate the front brake. However, it is also possible for the rear disc brake 4930 to be coupled to a hydraulic cylinder actuator 4946 so that counter clockwise movement of the rear wheel from the friction between the ground and the rear wheel can increase the front brake hydraulic brake pressure to actuate the front brake. In other embodiments, the rear disk brake can be coupled to a linkage system which can be coupled to a hydraulic actuator 4946 such as those described above. When the rear disk brake is actuated, the rear brake and linkages can move resulting in compression of the hydraulic fluid in the hydraulic actuator.

Figure 13:
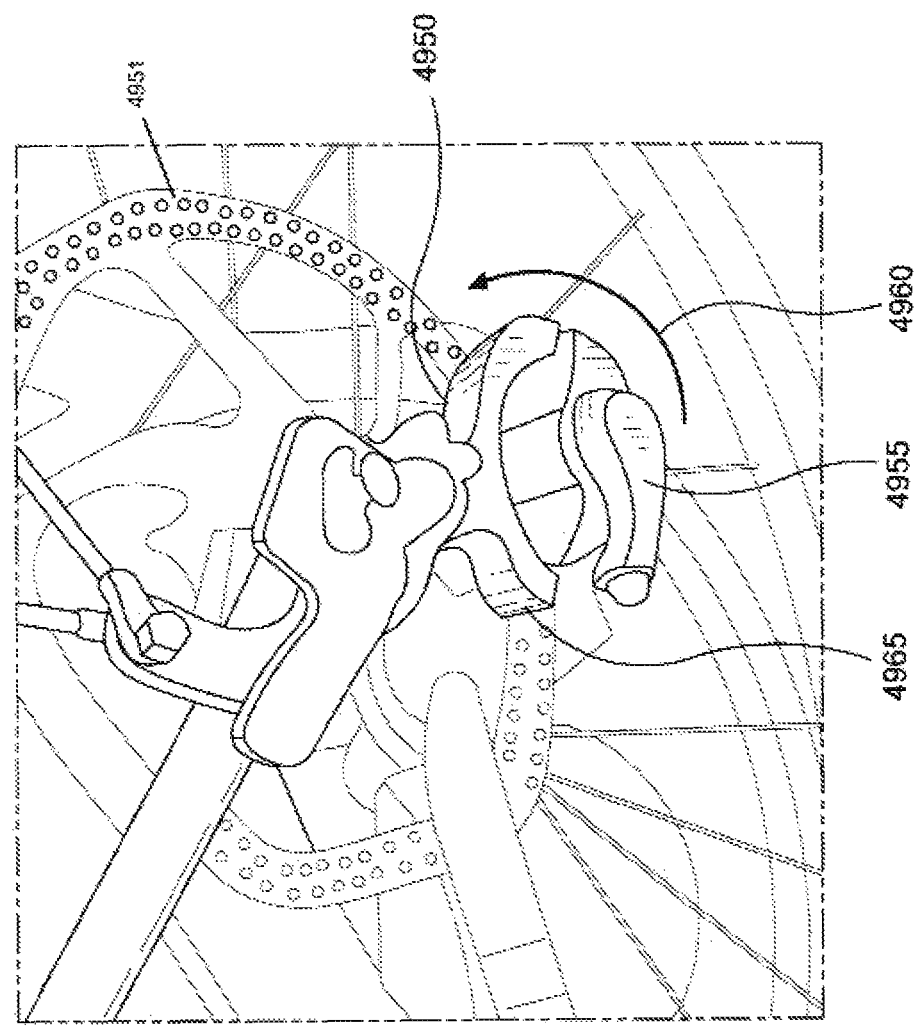
FIG. 13 illustrate a side perspective view of a rear disk brake system.

FIG. 13 illustrates another embodiment of the rear disk brake system. In this embodiment, a rear brake structure assembly 4950 is connected to a center axis of the rear hub. A disc brake caliper 4955 is mounted to the rear brake structure. The rear brake structure assembly 4950 can rotate about the center axis of the rear wheel assembly 4950 or about an axis of rotation that is parallel with the rotation axis of the rear disk 4951. When the rear brake caliper 4955 is actuated to reduce the bicycle's speed, the rear disc caliper 4955 will produce a friction force with the rear disk 4951 which will slow the rotation of the rear wheel. The rear brake structure assembly 4950 will rotate a short distance in a counter clockwise direction as shown by an arrow 4960. The rear brake structure assembly 4950 can include a piston that moves within a hydraulic cylinder and the movement of the piston pushes hydraulic fluid out the hydraulic cylinder. An end of a hydraulic actuator may be connected to a portion 4965 of the rear brake structure to actuate the front brake when the rear brake structure assembly 4950 moves with the rear brake disk 4951. When the rear disc caliper 4955 is actuated and the rear wheel loses traction with the ground, the rear brake structure assembly 4950 returns to a normal position and the force applied to the hydraulic actuator is released which prevents the front brake from locking up the front wheel.

Figure 15:
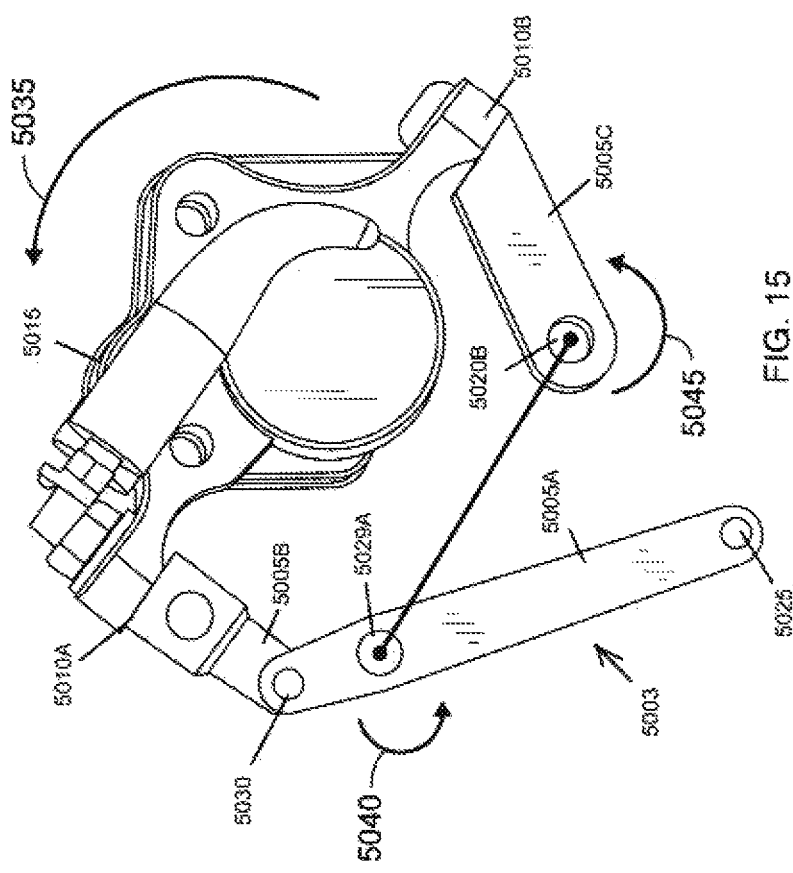
FIGS. 14-18 illustrate left side perspective views of rear disk brakes mounted on to rotating linkages.
Figure 14:
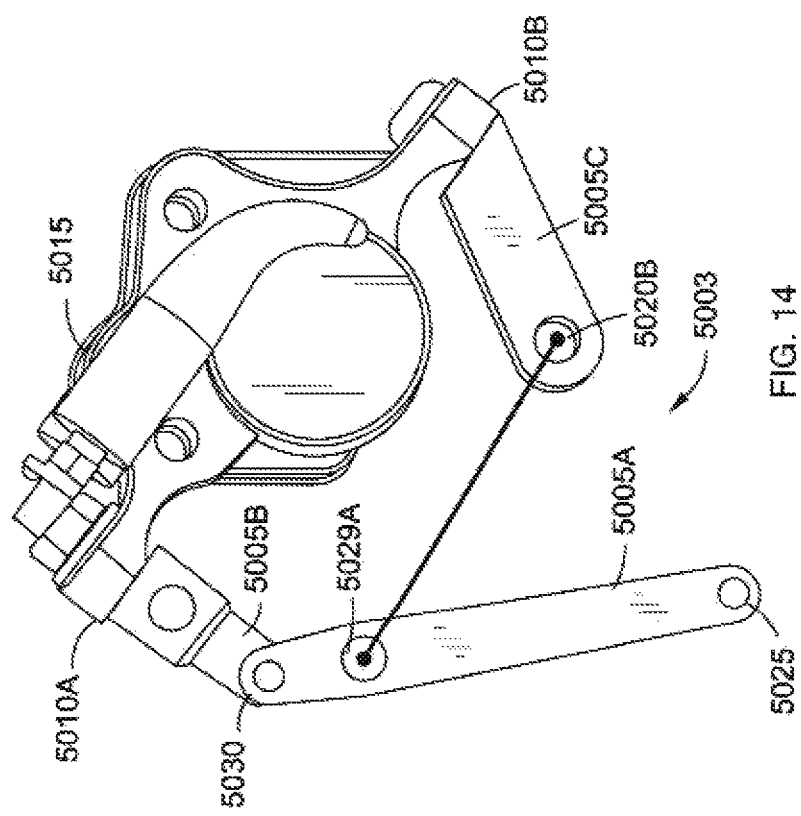

FIGS. 14 and 15 show a sequence of side views of a rear disc braking system having a mechanical linkage 5003. In an embodiment the linkage can be coupled to a front brake actuator. The mechanical linkage includes an assembly of bodies connected to manage forces and movement. In a specific embodiment, these forces and movements are from the actuation of the rear brake and result in the actuation of the hydraulic actuator and actuation of the front hydraulic brake. FIG. 14 shows the linkage in a released position and FIG. 15 shows the linkage in a second actuated position. The illustrated linkage system includes a first link 5005A, a second link 5005B, and a third link 5005C. In the illustrated embodiment, the second link 5005B can include a first disc brake mount 5010A and the third link 5005C can include a second disc brake mount 5010B upon which a disc brake 5015 can be attached. The first link 5005A and third link 5005C includes rotational joints 5020A and 5020B, respectively, which may be used to secure the linkage system to a bicycle frame. An end 5025 of the first link 5005A may be connected to an end of a hydraulic actuator. An opposite end 5030 of the first link 5005A is connected an end of the second link 5005B.

In a specific embodiment, the actuation of the rear brake 5015 causes the disc caliper grasp and assert a friction force on the rear brake disc. FIG. 14 illustrates the mechanical linkage 5003 in a non-actuated position where the rear brake is not asserting friction on the rotating rear disk or with the rear brake asserting a friction on the rotating rear disk with the rear wheel losing traction with the ground. In FIG. 14, the brake 5015 is to the left and the end 5025 of the first link 5005A is moved forward to the left. FIG. 15 shows the mechanical linkage 5003 when the fiction force of the rear brake 5015 against the rotating rear disk causes the rear brake 5015 to move in a counter clockwise direction as indicated by an arrow 5035. The first link 5005A rotates 5040 about joint 5020A and the third link 5005C rotates 5045 about joint 5020B. As shown in FIG. 15, the end 5025 of the first link 5005A then moves with a force to actuate the hydraulic actuator which can actuate the front brake.

In an embodiment, the linkage system can include a first joint, a second joint, and a hydraulic actuator. The second joint can be connected to a first tab on a bicycle frame and the second joint can be between the first joint and the hydraulic actuator attachment end. There is a second link of the linkage connected to the first joint and including a first mount, opposite the first joint, for a disc brake. There is a third link of the linkage and including a fourth joint and a second mount, opposite the fourth joint, for the disc brake. The fourth joint connects to a second tab on the bicycle frame.

Figure 16:
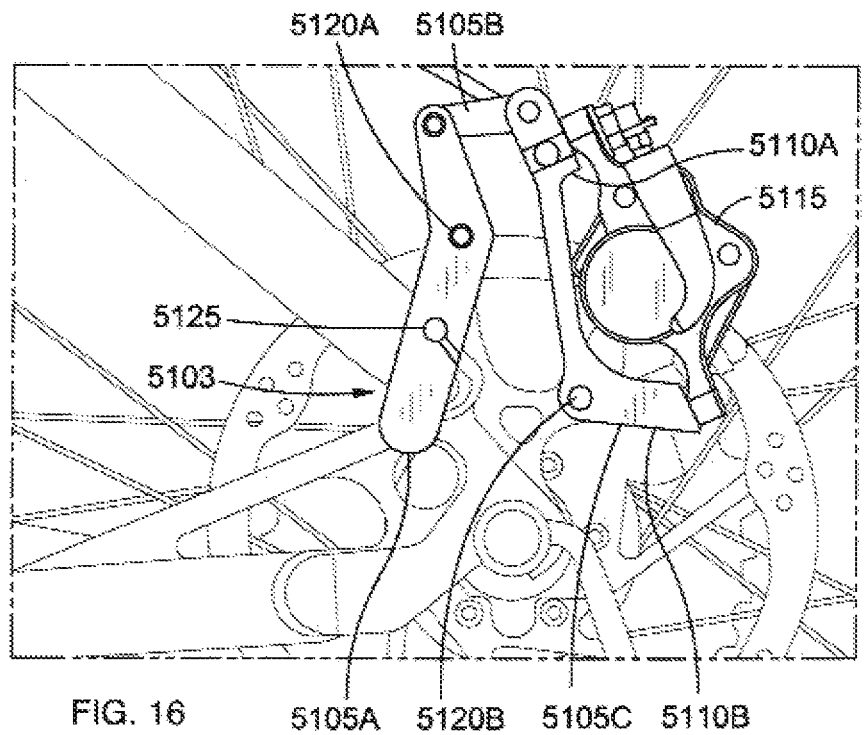
Figure 17:
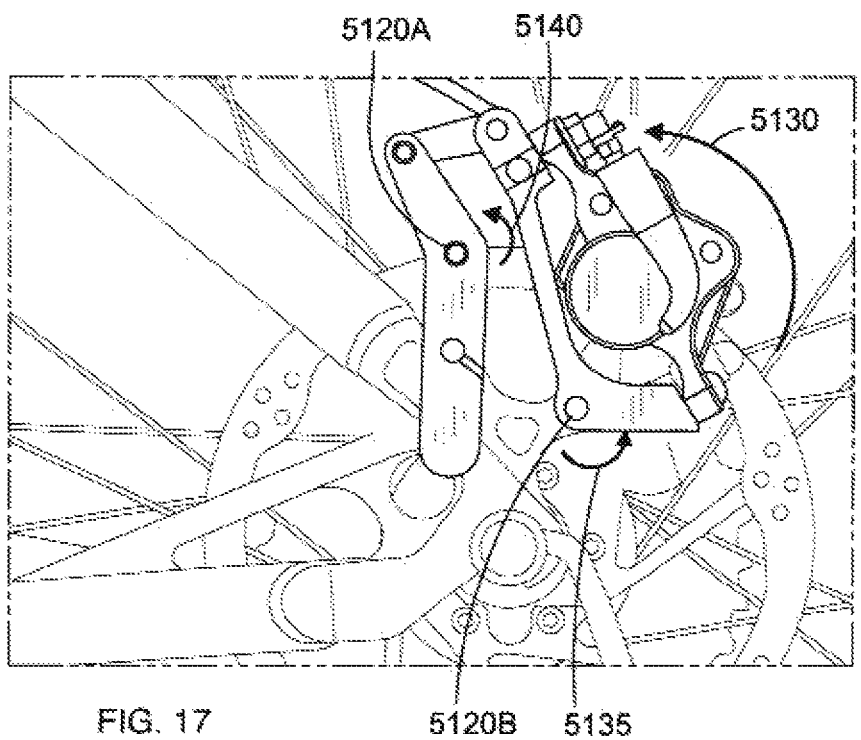
Figure 18:
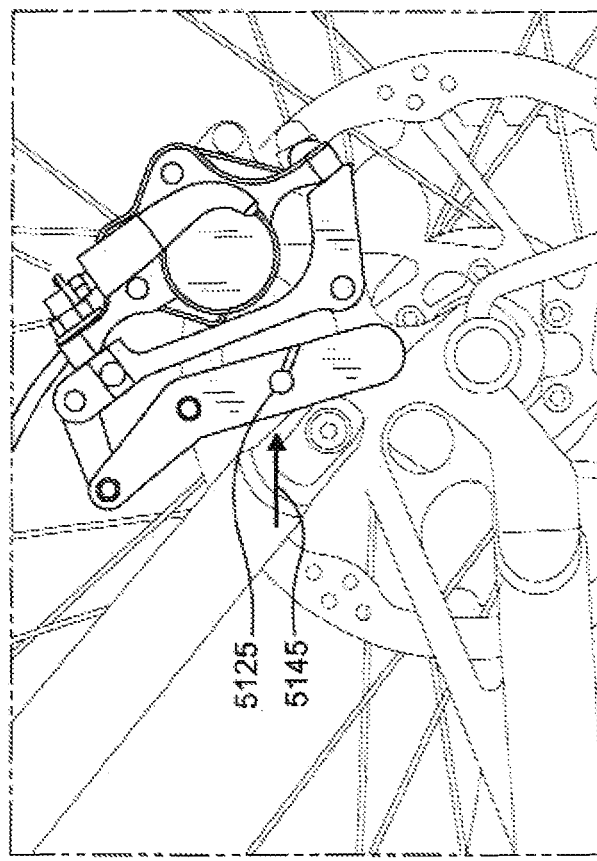

FIGS. 16-18 show side views of an embodiment of a rear brake linkage system during braking. The rear disc braking system can have a mechanical linkage 5103. In this specific embodiment, the linkage system includes a first link 5105A, a second link 5105B, and a third link 5105C. The second link 5105B is connected between the first link 5105A and the third link 5105C. The third link 5105C can include disc mounts 5110A and 5110B for attaching a disc brake 5115. A joint 5120A on the first link 5105A can connect the linkage system to a first disc tab on the bicycle frame. A joint 5120B on the third link can connect the linkage system to a second disc tab on the frame. An end of a hydraulic actuator may be connected at a point 5125 on the first link 5105A and movement of point 5125 actuates the hydraulic actuator.

FIG. 16 shows the linkage in a first position where the rear brake is released and the linkage system is in a relaxed position. The first position can occur when the rear brake is released or if the rear brake is actuated and the rear disc is not moving or if the rear brake is actuated and the rear wheel has lost traction with the ground. In the first position, the hydraulic actuator can be deactivated and the position of the first link 5105A and point 5125 are retracted and hydraulic pressure is not applied to the front brake. Since the front brake is not actuated the front wheel can rotate freely. FIG. 17 shows the linkage system in a second position where the rear brake is applying a partial braking force on the rotating rear brake disk. The rear brake can move with the rotating rear brake disk counter clockwise and the linkage system is also partially rotated counter clockwise. The actuation of the rear brake causes the disc caliper to move in a counter clockwise direction as indicated by an arrow 5130. The third link rotates 5135 about joint 5120B and the first link rotates 5140 about joint 5120A. The movement of the first link 5105A and point 5125 are partially rotated and the hydraulic actuator coupled to the point 5125 can be partially actuated. The hydraulic actuator can cause hydraulic pressure to be applied to the front brake. FIG. 18 shows the linkage in a third position where the rear brake is fully applied to the rear brake disk and the first link 5105A and point 5125 are fully rotated and the hydraulic actuator coupled to the point 5125 can be fully actuated. Point 5125 on the first link 5105A at which the end of a hydraulic actuator may be secured moves in a direction 5145 to actuate the hydraulic actuator and actuate the front brake as described above. The hydraulic actuator applies a full braking force to the rear brake disk and the linkage system is fully rotated counter clockwise applying maximum force to the front brake.

In a specific embodiment, a device includes a first link 5205A that includes a first joint, a second joint, and a hydraulic actuator attachment point. The second joint is between the first joint and the hydraulic actuator attachment end, and connects to a first tab on a bicycle frame. There is a second link of the linkage connected to the first joint. There is a third link of the linkage and including a third joint, a fourth joint, and a set of disc mounts for mounting a disc brake. The third joint is connected to the second link, and the fourth joint connects to a second tab on the bicycle frame.

Figure 20:
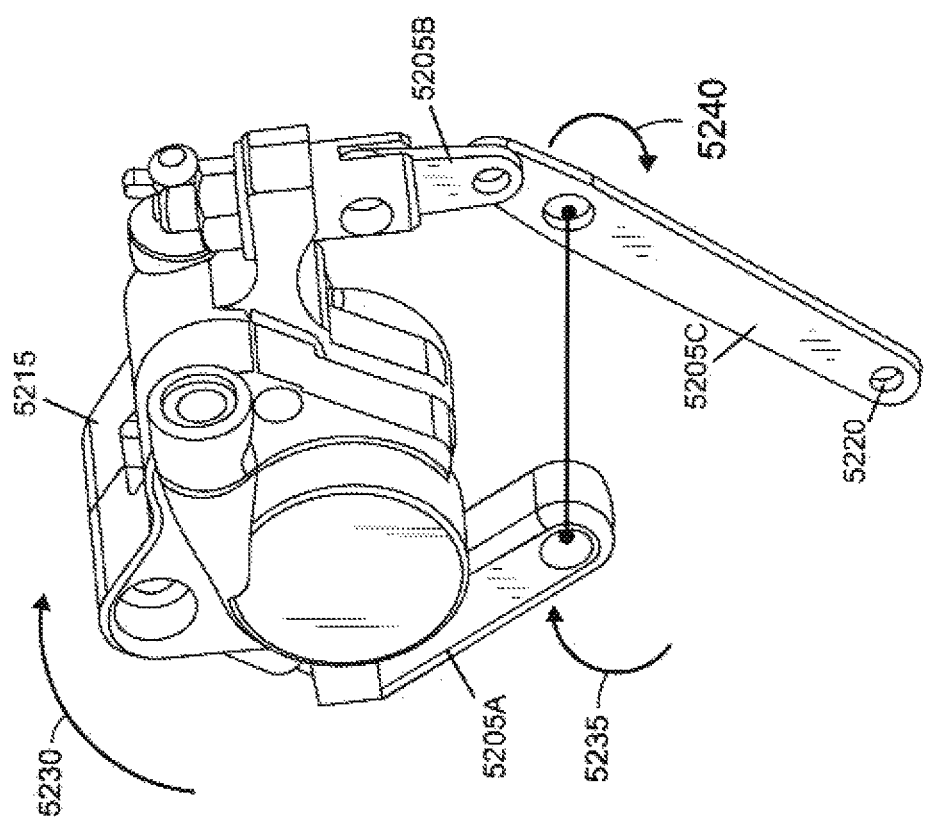
Figure 19:
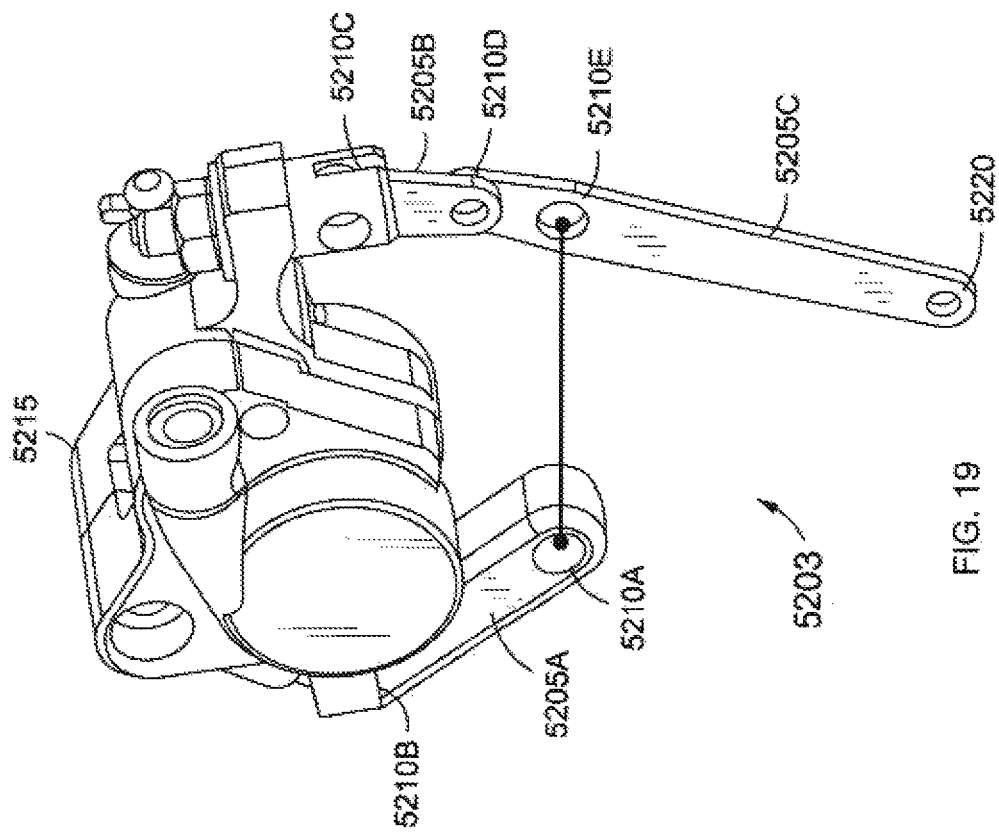

FIGS. 19-21 show a sequence of right side views of a rear disc braking system having a mechanical linkage 5203 in another specific embodiment of a brake system. As shown in this specific embodiment, the linkage includes a first link 5205A, a second link 5205B, and a third link 5205C. The first link includes a joint 5210A and a joint 5210B, opposite joint 5210A, and including mount for attaching a disc brake caliper 5215. Joint 5210A may be connected to the bicycle frame. The second link includes a joint 5210C and a joint 5210D, opposite joint 5210C and connecting the third link. Joint 5210C may include a mount for attaching the disc brake caliper. The third link includes a joint 5210E and an end 5220. Joint 5210E may be connected to the bicycle frame. End 5220 of the third link 5205C may be connected to an end of a hydraulic actuator. Movement of the End 5220 of the third link 5205C actuates the hydraulic actuator which applies or releases hydraulic fluid pressure to the front brake.

FIG. 19 shows the linkage in a first position with the rear brake caliper 5215 is disengaged so there is not friction against the rotating rear brake disk. In an embodiment, a spring may hold the linkage system in a disengaged or relaxed position. The end 5220 at the end of the third link 5205C can be rotated in a clockwise direction (facing the to a stop which in a lowered right position. The hydraulic actuator coupled to the end 5220 is not compressed or tensioned. In the first position, the hydraulic actuator coupled to the end 5220 can be deactivated. The position of the third link 5205C and point 5220 are retracted and hydraulic pressure is not applied to the front brake and the front wheel can rotate freely.

FIG. 20 shows the linkage in a second position where the rear brake 5215 is applying a partial braking force on the rotating rear brake disk. The rear brake 5215 can move with the rotating rear brake disk in a clockwise direction with the rear brake disk resulting in a friction force and the linkage system is also partially rotated clockwise. The actuation of the rear brake causes the disc caliper to move in a clockwise direction as indicated by an arrow 5230. The first link 5205A rotates in a clockwise direction 5235 about joint 5210A. The third link 5205C rotates in a clockwise direction 5240 about joint 5210E. The movement of the first link 5105A and point 5220 are partially rotated and the hydraulic actuator coupled to the point 5220 can be partially actuated. The hydraulic actuator can cause hydraulic pressure to be applied to the front brake to partially actuate the front brake.

In FIG. 21, the brake 5215 is fully actuated and the friction force against the rear brake disk causes the brake 5215 to move to the linkage system to a fully actuated position. The linkages 5205A and 5205C have rotated to a full clockwise position and the end 5220 of the third link 5205C can be attached an end of the hydraulic actuator which fully actuates the front brake which can apply maximum braking force to the front wheel. If the front brake locks the front wheel, the rear wheel can be pulled off the ground releasing the clockwise direction force on the rear brake 5215. The linkages 5205A, 5205C and brake 5215 can rotate in a counter clockwise direction which results in the end 5220 of the third link 5205C deactivating the actuator which releases the front brake as shown in FIG. 20.

Figure 22:
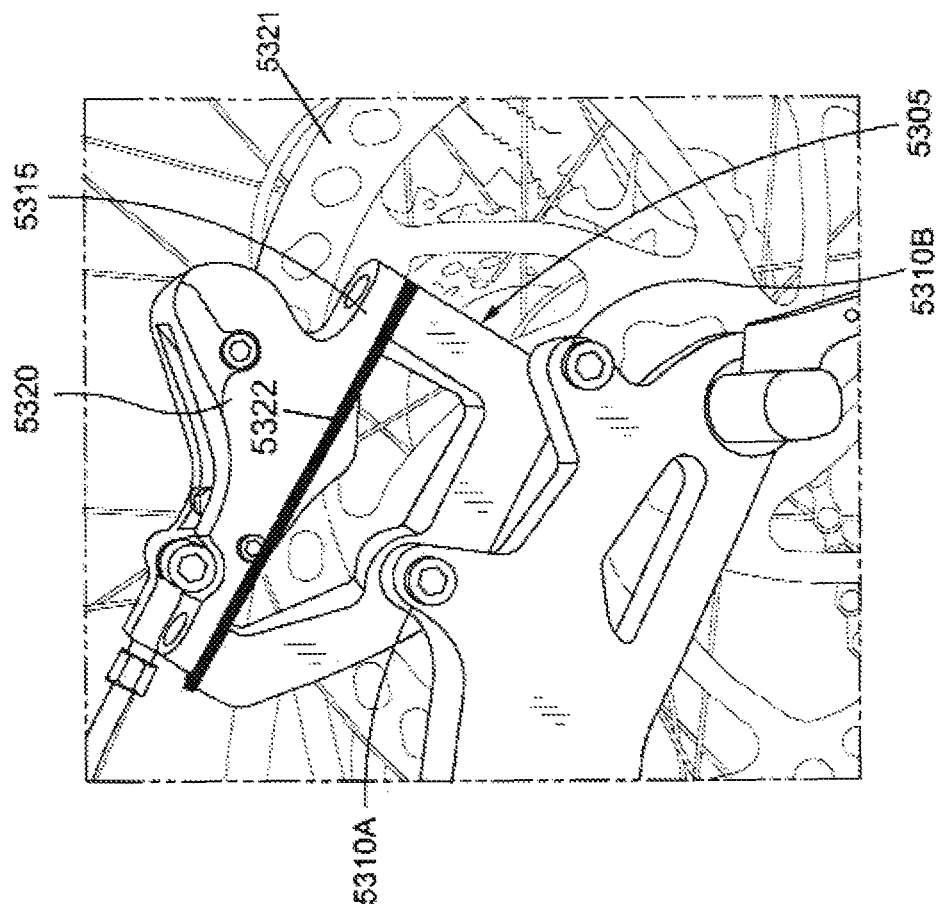
Figure 24:
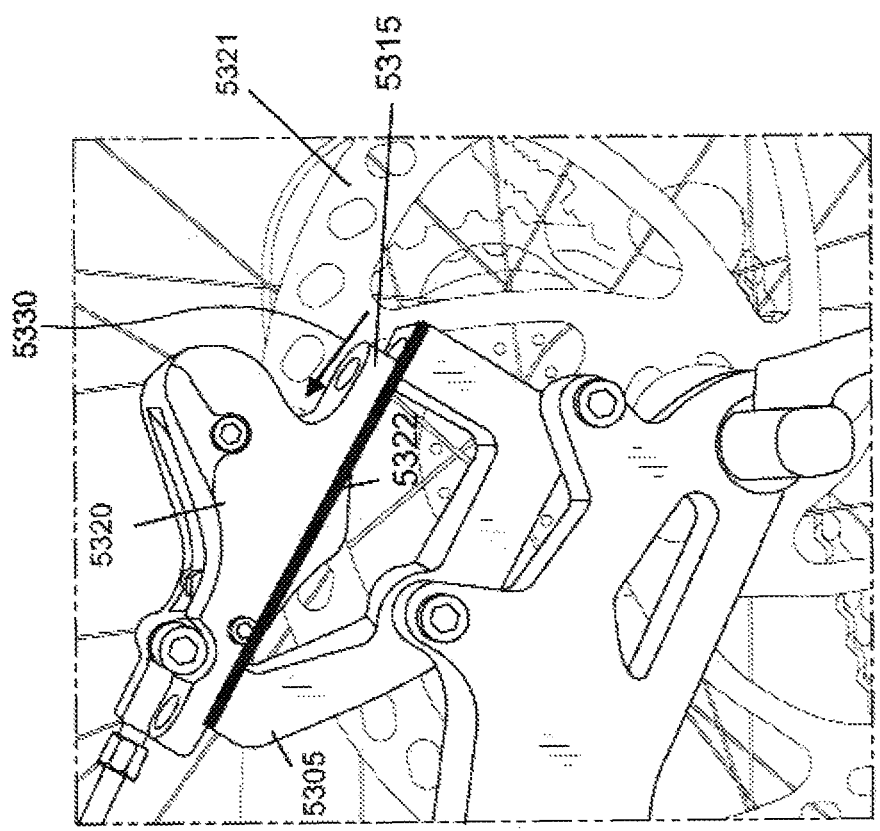

FIGS. 22-24 show a sequence of left side views of a rear disc braking system having a braking assembly or system that allows the disc brake caliper 5320 to move in a linear direction on a track 5322 against a brake mount 5305 in another specific embodiment. In a specific embodiment, a device includes a first set of mounts for attaching to a bicycle frame, and a carrier including a second set of mounts for attaching a rear disc brake caliper. The braking mount 5305 can include a set of disc mounts 5310A and 5310B for attaching the brake mount 5305 to disc tabs of the bicycle frame. The assembly further includes a sliding carrier 5315 upon which a disc brake caliper 5320 is mounted. The sliding carrier 5315 may travel along the track 5322 which is secured to the brake mount 5305.

FIG. 22 shows the system in a first position with the brake 5320 in a deactivated position where the rear brake is not actuated and does not contact the spinning rear disk. In the deactivated position, the sliding carrier 5315 is on the right side or rear portion of the track 5322. The carrier translates or slides in linear direction from a first position to a second position to actuate a front brake when the rear disc brake caliper is actuated. FIG. 23 shows the system in a second position where the rear brake 5320 is partially engaged against the rear disc 5321 with the disc brake caliper 5320 partially moved on the track 5322 on the brake mount 5305. The actuation of the rear brake 5320 while the rear wheel and rear disc 5321 are moving in a counter clockwise direction causes the disc caliper 5320 on the sliding carrier 5313 to move in a linear direction to the left as indicated by arrow 5330. A hydraulic actuator may be attached a portion of the sliding carrier 5315 so that a compression or tension force can be applied to the hydraulic actuator when the sliding carrier 5315 moves forward with the rotating rear disc 5321. The compression or tension force on the hydraulic actuator pressurizes the hydraulic fluid in the actuator causing hydraulic fluid to flow through hydraulic tubing to actuate the front hydraulic brake. FIG. 24 shows the system in a third position with the disc brake caliper 5320 fully moved against the brake mount 5305 and the sliding carrier 5313 to move in a linear direction further to the left as indicated by arrow 5330. The additional movement of the sliding carrier 5313 causes the hydraulic actuator to drive additional hydraulic fluid flow through hydraulic tubing to further actuate the front hydraulic brake.

Figure 25:
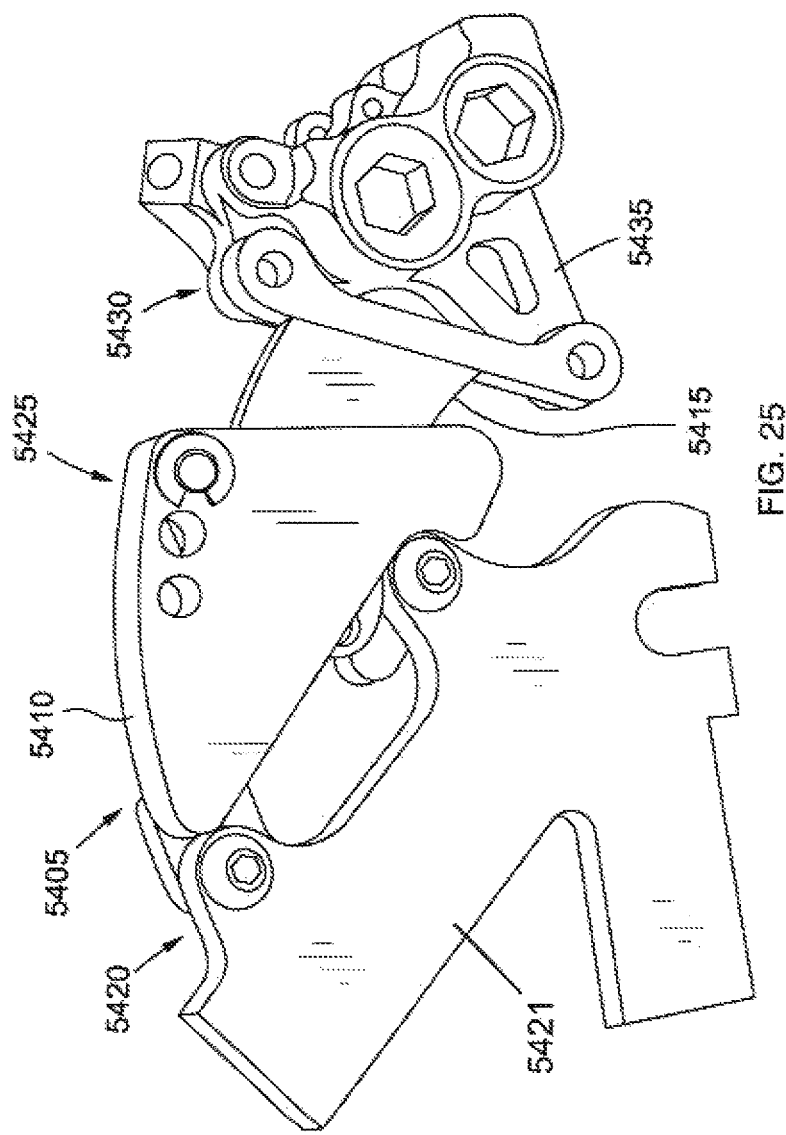
FIG. 25 illustrates a left side perspective view of rear disk brake mounted on an actuate movement assembly.

FIG. 25 shows a left side view of a rear disc braking system that may be referred to as a floating caliper braking assembly. In this specific embodiment, an assembly 5405 includes a first structure 5410 and a second structure 5415. The first structure includes a set of mounts 5420 to attach the assembly 5405 to a bicycle frame 5421 and adjustable settings 5425. The second structure 5415 includes a set of mounts 5430 for attaching a disc brake caliper 5435.

In this specific embodiment, the actuation of the rear brake caliper 5435 causes the rear brake to contact the rotating rear disk which slows the rotation of the rear wheel. The second structure 5415 moves with the rotating rear disk towards the first structure 5410. The movement of the second structure 5415 may be in an arc which includes translation and rotation. A hydraulic actuator may be secured to a portion of the second structure 5415 and the movement of the second structure 5415 actuates the hydraulic actuator which actuates the front brake. In a specific embodiment, the second structure 5415 on which the caliper 5435 is attached moves into a guide that may be on the first structure 5410. For example, the guide may include a channel, track, or groove on the first structure through which a portion of the second structure 5415 slides. The shape of the channel helps to direct the movement of the caliper 5435 so that the brake remains in contact with the rear disk throughout the movement of the second structure 5415. The channel may be an arc curvature or curvilinear. There may be a stop on the first structure 5410 or the second structure 5415 to limit the movement of the second structure 5415.

Figure 26:
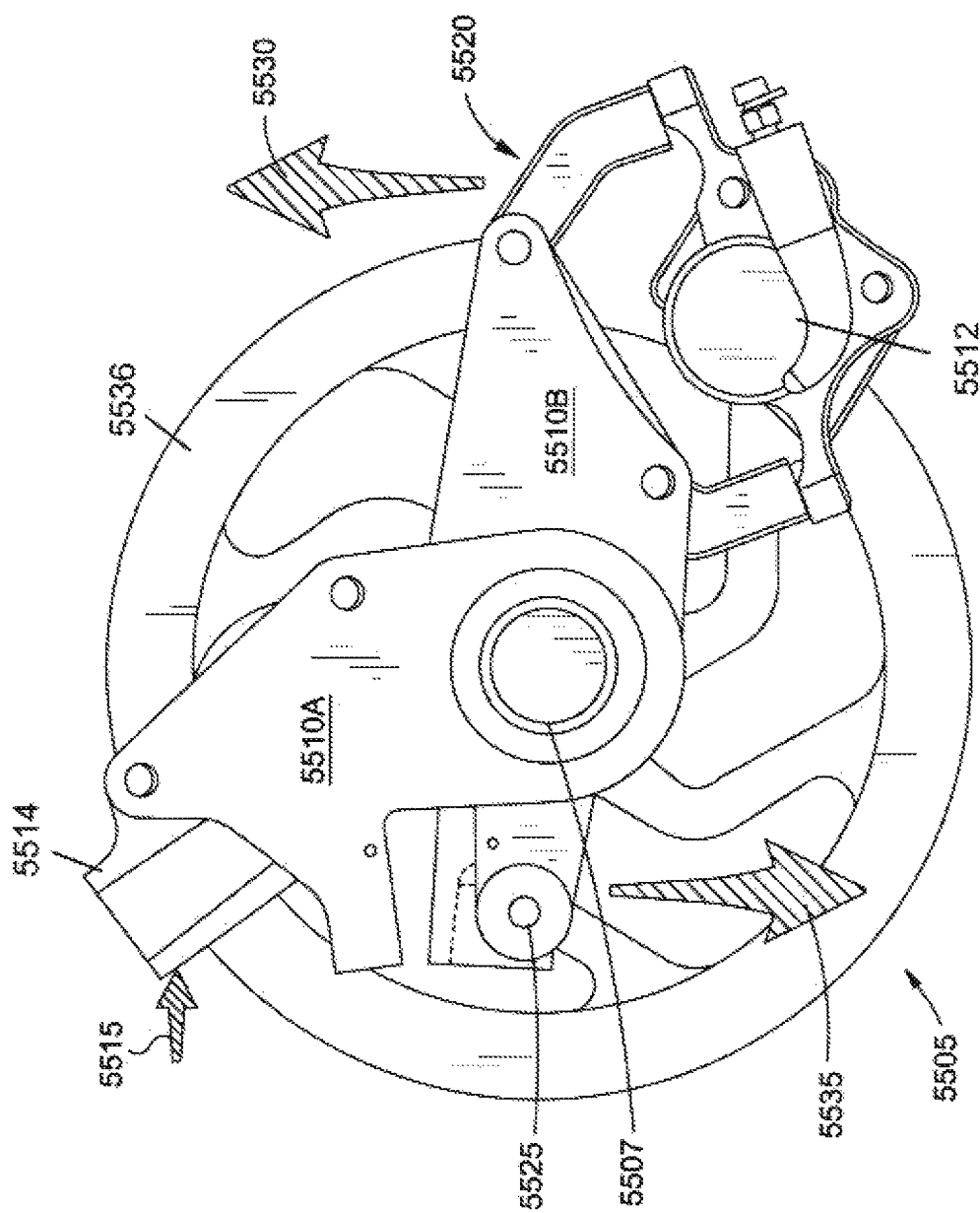
FIG. 26 illustrates a left side view of rear disk brake mounted on rotational assembly.

FIG. 26 shows a left side view of a rear disc braking system 5505 in another specific embodiment. The illustrated braking system 5505 includes a first structure 5510A and a second structure 5510B that rotates towards the first structure 5510A when the rear brake applies a friction force to the rotating rear disk 5536. The second structure 5510B may be rotatably connected to a frame 5514 with the second structure 5510B rotating about the rear rotational axle 5507 axis of the rear disk and rear wheel so that the rear brake caliper 5512 remains centered on the rear disk 5536 throughout the movement of the second structure 5510B. The first structure 5510A can include a set of mounting holes for attaching the rear disc braking system 5505 to a seat stay 5515 of the bicycle frame 5514. The second structure can include brake mounts 5520 attached to a disc brake caliper 5512 and a hydraulic actuator attachment point 5525. When the rear brake caliper 5512 is actuated and it applies a friction force to the rotating rear disk 5536 and the second structure 5510B rotates counter clockwise with the rear disk 5536 about the rotational axle 5507. An end 5525 of the second structure 5510B moves down and counter clockwise in a direction as indicated by an arrow 5530. The end 5525 of the second structure 5510B is attached a hydraulic actuator. The movement of the end 5525 of the second structure 5510B actuates the hydraulic actuator which causes hydraulic fluid to flow out of the hydraulic actuator and through a tube to actuate the front brake.

Figure 27:
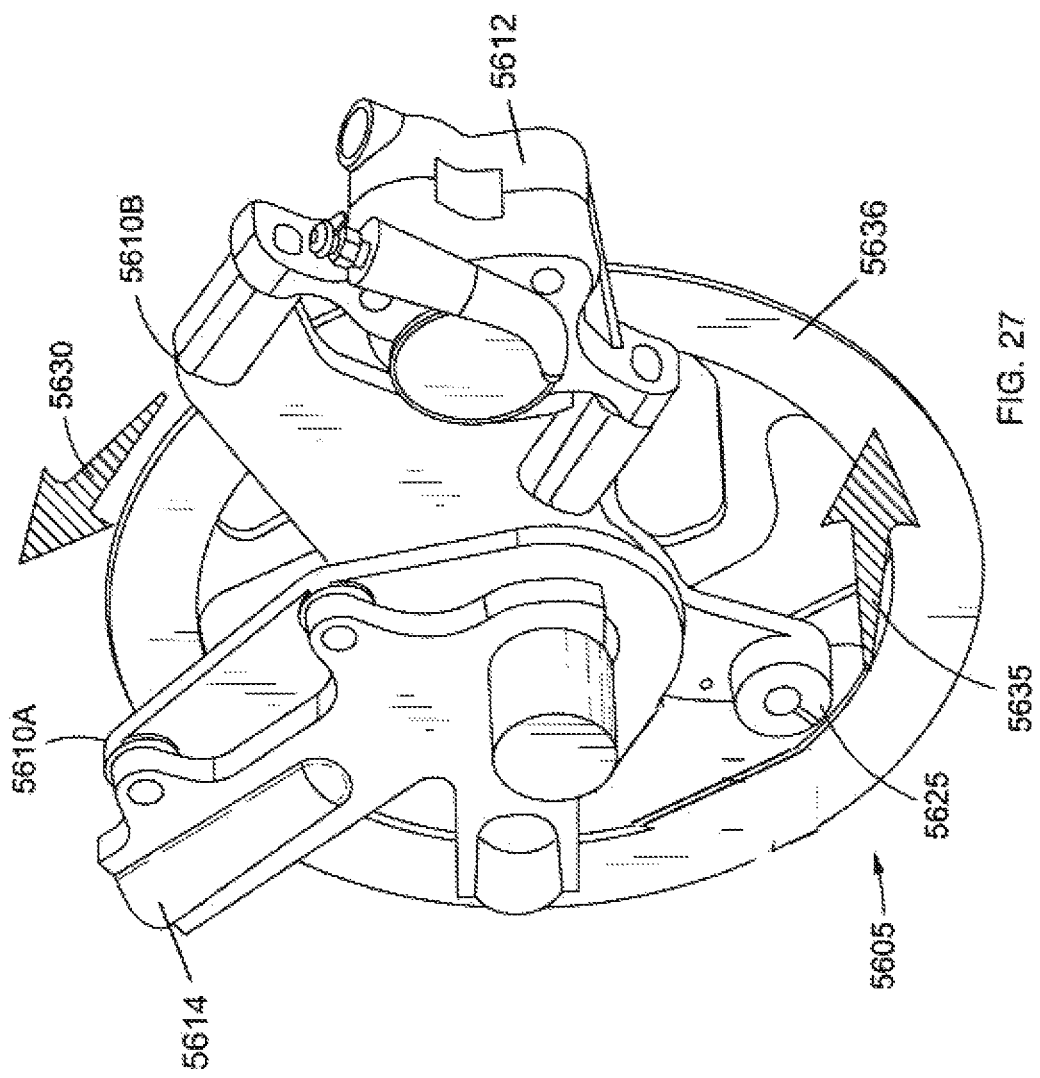
FIG. 27 illustrates a left side perspective view of rear disk brake mounted on rotational assembly.

FIG. 27 shows a left side perspective view of a rear disc braking system 5605 that is similar to the system described above with reference to FIG. 26. The braking system 5605 is mounted on the frame 5614. The rear disc braking system 5605 includes a first structure 5610A and a second structure 5610B that moves towards the first structure 5610A when the rear brake caliper 5612 clamps the rear disk 5636 which is rotating counter clockwise. The attachment point 5625 is coupled to a hydraulic actuator and the actuation of the actuators compresses the piston within the cylinder to pressurize the hydraulic fluid which flows from the rear actuator to actuate the front brake.

Figure 28:
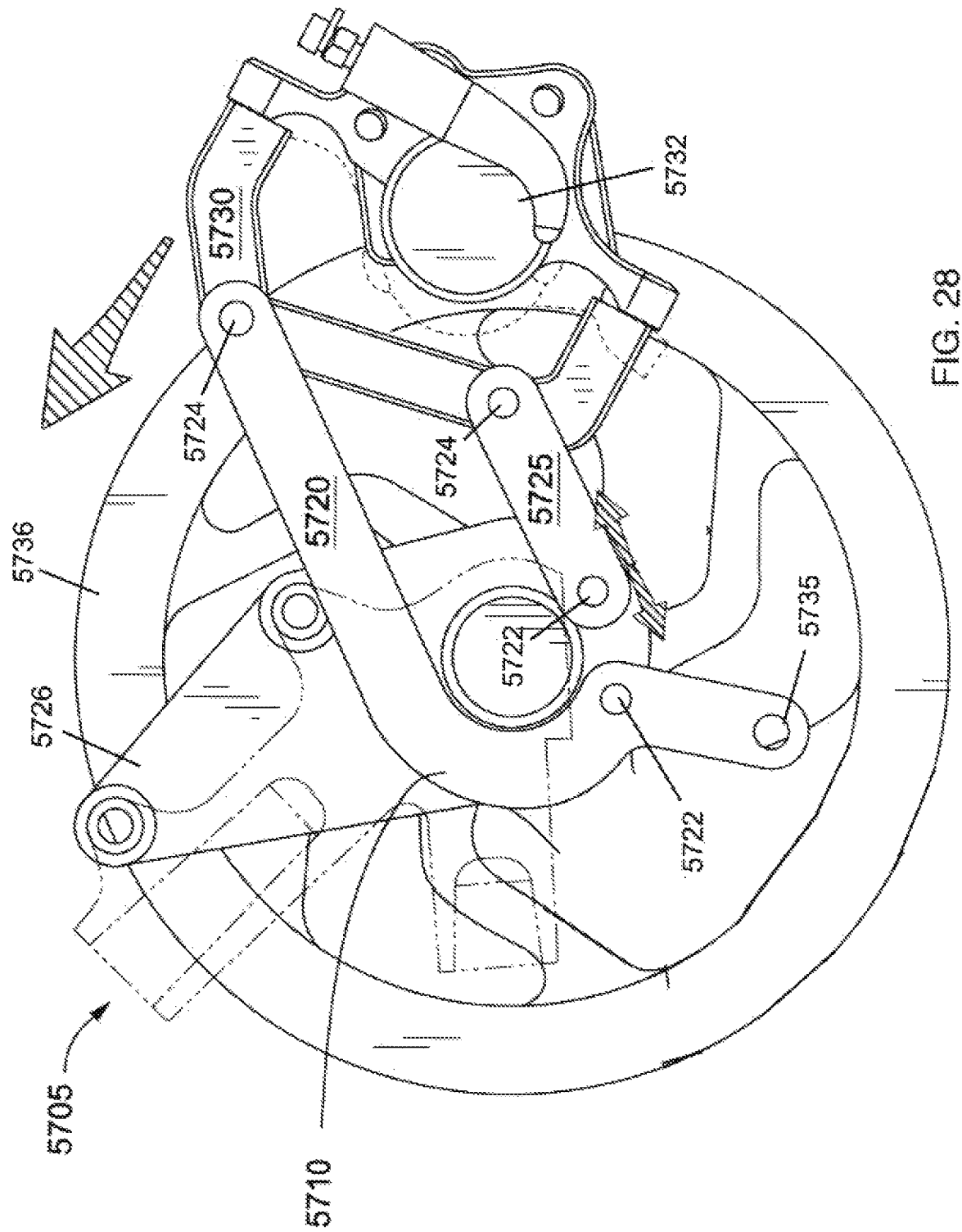
FIG. 28 illustrates a side view of rear disk brake mounted on to movable linkages.

FIG. 28 shows a left side view of a rear disc braking system in another embodiment. The braking system 5705 includes a rear brake mount 5726 attached to the frame and a linkage system 5710 that includes a first link 5720 and a second link 5725 rotatably coupled to a rear brake mount 5730 at two rotatable couplings 5724 that can be bearings or bushings. A brake caliper 5732 is attached to the rear brake mount 5730. The first link 5720 and the second link 5725 are attached to the rear brake mount 5726 at rotational couplings 5722. An end of the first link 5720 includes a hydraulic actuator attachment point 5735. FIG. 28 shows the brake 5705 in the normal unactuated position where the brake 5732 is released and not contacting the rotating disk 5736 and the first link 5720 and second link 5725 are rotated clockwise. When the rear brake caliper 5732 is actuated, it will create friction against the rotating rear disk 5736 and move counter clockwise with the rotating disk 5736. The first link 5720 and the second link 5725 will also rotate counter clockwise about the rotational couplings 5722. The end 5735 will move the hydraulic actuator which will be transmitted to the front brake through a hydraulic tube so the front brake is actuated. When the rear wheel comes off the ground, the rotational force on the rear disk will be relieved and the hydraulic actuator which and the front brake will be deactuated.

Figure 29:
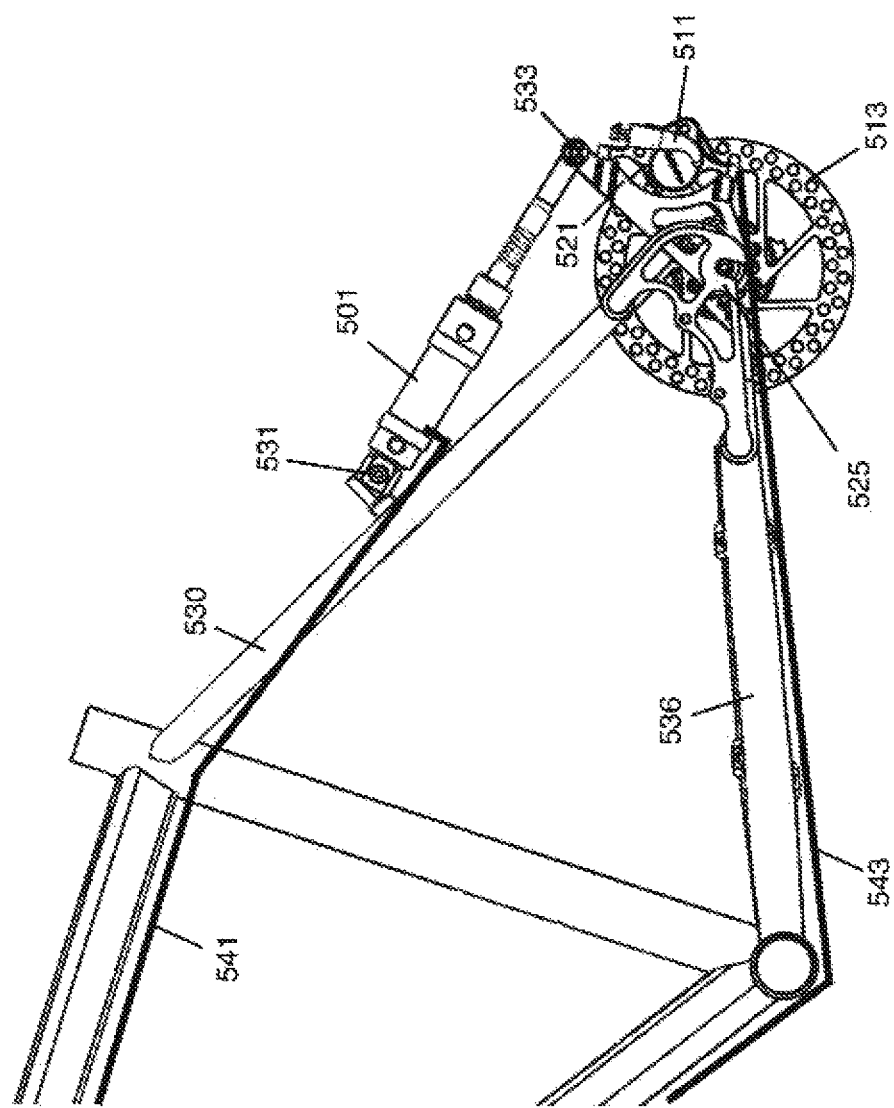
FIGS. 29-31 illustrate side views of rear disk brakes mounted lever arms coupled to hydraulic actuators.
Figure 30:
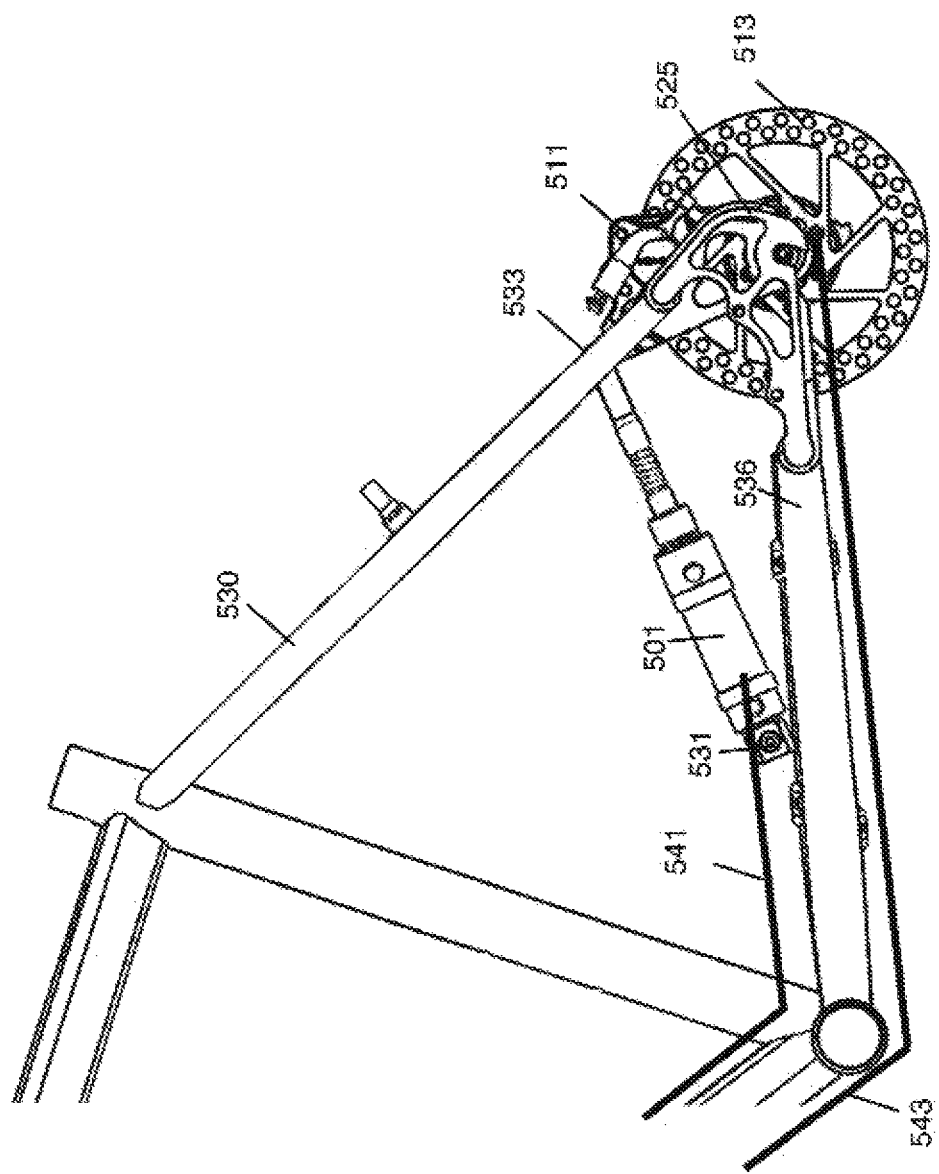
Figure 31:
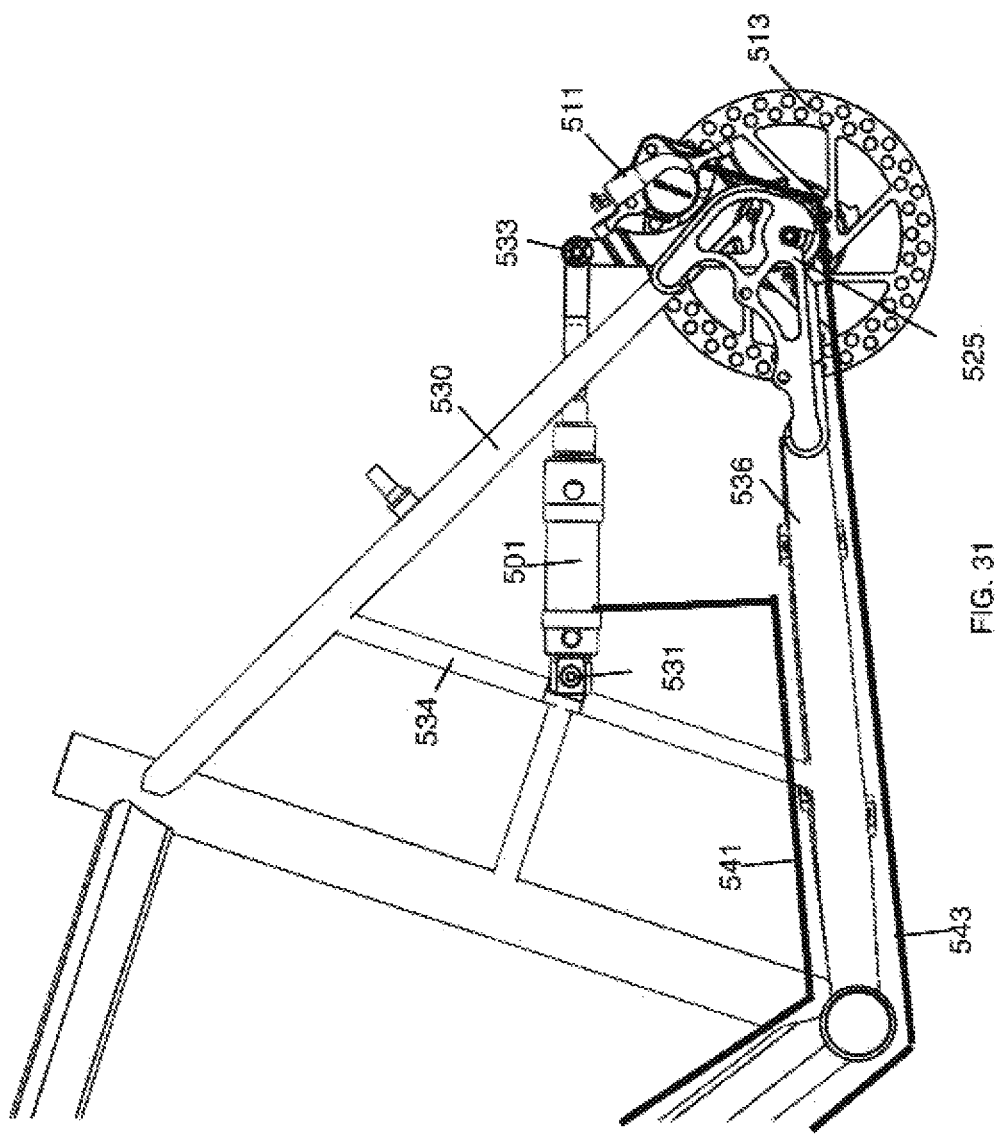

With reference to FIGS. 29-31, embodiments of a rear hydraulic brake system are illustrated. In these embodiments, the rear disk brake 511 is coupled to a lever 521. One end of the lever 521 can be mounted on a rotational pivot point on the rear wheel dropout 525 and the opposite end of the lever 521 can have a rotational coupling 533 coupled to an end of a hydraulic actuator 501. When the rear hydraulic disk brake 511 is actuated, a user can actuate a rear brake lever and hydraulic fluid can be pressurized in the rear brake hydraulic tubing 543 which actuates the rear brake 511. The fiction force between the rear brake 511 and the rear disk rotor 513 causes the rear brake 511 on the lever 521 to rotate counter clockwise which compresses the hydraulic actuator 501. The hydraulic actuator 501 compression pressurizes hydraulic fluid which travels through a hydraulic tubing 541 to a front hydraulic disk brake.

If the rear wheel loses traction or rises off the ground, the rear disk rotor 513 will no longer have the same rotational torque and the hydraulic actuator 501 will not be compressed or be less compressed which relieves the hydraulic pressure applied by the hydraulic actuator 501 to the front brake allowing the front wheel to rotate rather than locking up which can cause the rider to fall off of the vehicle.

With reference to FIG. 29, the hydraulic actuator 501 is coupled to a hinge 531 mounted on middle portion of the left seat stay tube 530 of the frame. The hinge 531 can have an axis of rotation that is perpendicular a plane defined by the rear disk rotor 513. The hinge 531 can also have an axis of rotation which is perpendicular to the plane of the rear disk rotor 513. The brake 511 can be attached to a rotational coupling 525 mounted on the rear dropout which holds the rear axle of the rear wheel. When the rear brake 511 is actuated, the rear brake 511 will rotate counter clockwise with the rotating rear disk 513 about the rotational coupling 525. This movement will compress the hydraulic actuator 501 and hydraulic fluid will flow through the hydraulic tubing 541 to actuate the front hydraulic disk brake.

With reference to FIG. 30, the hydraulic actuator 501 is coupled to a hinge 531 mounted on the left chain stay tube 536 of the frame. The hinge 531 can be aligned with a plane defined by the rear disk rotor 513. The hinge 531 can also have an axis of rotation which is perpendicular to the plane of the rear disk rotor 513. When the rear brake 511 is actuated, the rear brake 511 will rotate counter clockwise with the rotating rear disk 513 about the rotational coupling 525. This movement will compress the hydraulic actuator 501 and hydraulic fluid will flow through the hydraulic tubing 541 to actuate the front hydraulic disk brake.

With reference to FIG. 31, the hydraulic actuator 501 is coupled to a hinge 531 mounted on a cross beam structure 534 mounted between the seat stay tube 536 of the frame. The end of the hydraulic actuator 501 can be attached to a hinge 531 on the cross beam structure 534. The hinge 531 can be aligned with a plane defined by the rear disk rotor 513. The hinge 531 can also have an axis of rotation which is perpendicular to the plane of the rear disk rotor 513. When the rear brake 511 is actuated, the rear brake 511 will rotate counter clockwise with the rotating rear disk 513 about the rotational coupling 525. This movement will compress the hydraulic actuator 501 and hydraulic fluid will flow through the hydraulic tubing 541 to actuate the front hydraulic disk brake.

It should be appreciated that the various braking designs shown in the figures are merely examples of particular implementations of the braking system. In other implementations, other similar and equivalent elements and functions may be used or substituted in place of what is shown. A rotating mechanism or sliding mechanism may include bearings, bushings, pulleys, or combinations of these.

The present disclosure, in various embodiments, includes components, methods, processes, systems and/or apparatus substantially as depicted and described herein, including various embodiments, subcombinations, and subsets thereof. Those of skill in the art will understand how to make and use the present disclosure after understanding the present disclosure. The present disclosure, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation. Rather, as the flowing claims reflect, inventive aspects lie in less than all features of any single foregoing disclosed embodiment.

What is claimed is:

1. A hydraulic braking system for a vehicle, the hydraulic braking system comprising:
 a front brake assembly configured to slow rotation of a front wheel, wherein the front brake assembly is coupled to a front brake hydraulic tubing;
 a rear brake assembly configured to slow rotation of a rear wheel, the rear brake assembly comprising a first brake pad and a second brake pad, the first brake pad disposed on a first side of a rear disc, and the second brake pad disposed on a second side of the rear disc opposite the first side;
 a rear brake lever coupled to the rear brake assembly, wherein actuation of the rear brake lever causes actuation of the first and the second brake pads of the rear brake assembly to contact the rear disc to slow the rotation of the rear wheel and move the second brake pad forward relative to the first brake pad;

a hydraulic actuator comprising a cylinder configured to hold a hydraulic fluid and a piston configured to slide within the cylinder to compress the hydraulic fluid, wherein the second brake pad is coupled to the piston;

wherein the rear brake assembly is configured to actuate the first and the second brake pads to contact the rear disc to slow the rotation of the rear wheel while the rear wheel is in contact with a ground surface and move the second brake pad of the rear brake assembly forward relative to the first brake pad, causing the piston to move within the cylinder of the hydraulic actuator to compress the hydraulic fluid so that the hydraulic fluid moves through the front brake hydraulic tubing to actuate the front brake assembly to slow the rotation of the front wheel.

2. The hydraulic braking system of claim 1, wherein the cylinder of the hydraulic actuator is coupled to a chain stay of a frame of the vehicle.

3. The hydraulic braking system of claim 1, wherein the cylinder of the hydraulic actuator is coupled to a seat stay of a frame of the vehicle.

4. The hydraulic braking system of claim 1, wherein the cylinder of the hydraulic actuator is coupled to a structure mounted between a seat stay and a chain stay of a frame of the vehicle.

5. The hydraulic braking system of claim 1, wherein the cylinder of the hydraulic actuator is coupled to a hinge mounted on a frame of the vehicle.

6. The hydraulic braking system of claim 1, wherein the second side of the rear disc is a right side.

7. A hydraulic braking system for a vehicle, the hydraulic braking system comprising:
 a front brake assembly coupled to a front brake hydraulic tubing, the front brake assembly configured to releasably engage a front brake disc coupled to a front wheel to slow rotation of the front wheel;
 a rear brake assembly coupled to a rear brake hydraulic tubing, the rear brake assembly comprising a first brake pad and a second brake pad, the first brake pad disposed on a first side of a rear disc, and the second brake pad disposed on a second side of the rear disc opposite the first side, wherein the rear brake assembly releasably engages a rear brake disk coupled to a rear wheel to slow rotation of the rear wheel;
 a rear brake lever coupled to the rear brake hydraulic tubing, wherein actuation of the rear brake lever is configured to cause actuation of the rear brake assembly;
 a hydraulic actuator comprising a cylinder configured to hold a hydraulic fluid and a piston configured to slide within the cylinder to compress the hydraulic fluid, wherein a first portion of the hydraulic actuator is coupled to the rear brake assembly and a second portion of the hydraulic actuator is coupled to a frame of the vehicle, and wherein the second brake pad is coupled to the piston;
 wherein the rear brake lever is configured to be actuated to actuate the rear brake assembly to move the first and the second brake pads to contact the rear disc to slow the rotation of the rear wheel and move the second brake pad forward relative to the first brake pad to cause the piston to move within the cylinder of the hydraulic actuator to urge movement of the hydraulic fluid through the front brake hydraulic tubing to actuate the front brake assembly.

8. The hydraulic braking system of claim 7, wherein the second portion of the hydraulic actuator is coupled to a chain stay of the frame.

9. The hydraulic braking system of claim 7, wherein the second portion of the hydraulic actuator is coupled to a seat stay of the frame.

10. The hydraulic braking system of claim 7, wherein the second portion of the hydraulic actuator is coupled to a structure mounted between a seat stay and a chain stay of the frame.

11. The hydraulic braking system of claim 7, wherein the second side of the rear disc is a right side.

12. The hydraulic braking system of claim 7, wherein the vehicle is an electric powered vehicle.

13. A hydraulic braking system for a vehicle, the hydraulic braking system comprising:
 a rear brake surface coupled to a rear wheel;
 a rear brake assembly coupled to a first end of a first hydraulic tubing wherein the rear brake assembly comprises a first brake pad and a second brake pad, the first brake pad disposed on a first side of the rear brake surface, and the second brake pad disposed on a second side of the rear brake surface opposite the first side, and wherein the rear brake assembly is configured to releasably engage the rear brake surface to slow a rotation of the rear wheel;
 a rear brake lever coupled to a second end of the first hydraulic tubing, wherein actuation of the rear brake lever is configured to cause actuation of the rear brake assembly; and
 a hydraulic actuator comprising a cylinder configured to hold a hydraulic fluid and a piston configured to slide within the cylinder to compress the hydraulic fluid;
 wherein the rear brake lever is configured to be actuated to actuate the rear brake assembly to move the first and the second brake pads to contact the rear brake surface to slow the rotation of the rear wheel and move the second brake pad forward relative to the first brake pad to move the piston within the cylinder to urge the hydraulic fluid to flow through a second hydraulic tubing to actuate a front brake to slow rotation of a front wheel.

14. The hydraulic braking system of claim 13, wherein the cylinder of the hydraulic actuator is coupled to a chain stay of a frame of the vehicle.

15. The hydraulic braking system of claim 13, wherein the cylinder of the hydraulic actuator is coupled to a seat stay of a frame of the vehicle.

16. The hydraulic braking system of claim 13, wherein the cylinder of the hydraulic actuator is coupled to a structure mounted between a seat stay and a chain stay of a frame of the vehicle.

17. The hydraulic braking system of claim 13, wherein the second side of the rear brake surface is a right side.

18. The hydraulic braking system of claim 13, wherein the vehicle is an electric powered vehicle.

19. The hydraulic braking system of claim 13, wherein the vehicle is a bicycle.

20. The hydraulic braking system of claim 1, wherein the vehicle is a bicycle.

* * * * *